United States Patent
Yang et al.

(10) Patent No.: US 11,716,757 B2
(45) Date of Patent: Aug. 1, 2023

(54) CLEAR CHANNEL ASSESSMENT

(71) Applicant: QUALCOMM Incorporated, San Diego, CA (US)

(72) Inventors: Lin Yang, San Diego, CA (US); Bin Tian, San Diego, CA (US); Youhan Kim, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 17/382,242

(22) Filed: Jul. 21, 2021

(65) Prior Publication Data

US 2022/0030625 A1 Jan. 27, 2022

Related U.S. Application Data

(60) Provisional application No. 63/056,399, filed on Jul. 24, 2020.

(51) Int. Cl.
*H04W 74/08* (2009.01)
*H04L 5/00* (2006.01)
(Continued)

(52) U.S. Cl.
CPC ......... *H04W 74/0808* (2013.01); *H04L 5/001* (2013.01); *H04W 24/10* (2013.01); *H04W 84/12* (2013.01)

(58) Field of Classification Search
CPC . H04W 74/0808; H04W 24/10; H04W 84/12; H04L 5/001
(Continued)

(56) References Cited

U.S. PATENT DOCUMENTS 11,160,109 B2 * 10/2021 Yang ............... H04L 5/0098
2007/0242621 A1 * 10/2007 Nandagopalan ..... H04B 17/318
370/254
(Continued)

FOREIGN PATENT DOCUMENTS

WO  WO 2015/144200  * 10/2015 ............ H04W 28/18
WO  2020015528 A1  1/2020

OTHER PUBLICATIONS

International Search Report and Written Opinion—PCT/US2021/042805—ISA/EPO—dated Nov. 15, 2021.

*Primary Examiner* — Christopher R Crompton
(74) *Attorney, Agent, or Firm* — Polsinelli / Qualcomm

(57) ABSTRACT

This disclosure provides methods, devices and systems for clear channel assessment (CCA). In one aspect a device performs a first clear channel assessment (CCA) check on a primary subchannel of a channel having a total bandwidth greater than or equal to 40 megahertz (MHz), a plurality of subchannels of the channel collectively spanning the total bandwidth of the channel, the plurality of subchannels including the primary subchannel and one or more secondary subchannels, the primary subchannel and the one or more secondary subchannels each having a bandwidth of 20 MHz, performs, on each of the one or more secondary subchannels, a respective second CCA check, and transmits a communication on the channel based on a status of each of the primary subchannel and the one or more secondary subchannels that is based on the performance of the respective second CCA check or the first CCA check.

32 Claims, 19 Drawing Sheets

(51) Int. Cl.
*H04W 24/10* (2009.01)
*H04W 84/12* (2009.01)

(58) Field of Classification Search
USPC .......................................................... 370/329
See application file for complete search history.

(56) References Cited

U.S. PATENT DOCUMENTS

| | | | |
|---|---|---|---|
| 2013/0208587 A1* | 8/2013 | Bala .................. | H04W 72/0446 370/278 |
| 2015/0009907 A1* | 1/2015 | Merlin ............... | H04W 74/0808 370/329 |
| 2020/0178299 A1 | 6/2020 | Yang et al. | |
| 2021/0144739 A1* | 5/2021 | Jiang .................. | H04L 27/2613 |

* cited by examiner

CLEAR CHANNEL ASSESSMENT

CROSS-REFERENCE TO RELATED APPLICATIONS

This application claims the benefit of U.S. Provisional Application No. 63/056,399, filed, Jul. 24, 2020, which is hereby incorporated by reference, in its entirety and for all purposes.

TECHNICAL FIELD

This disclosure relates generally to wireless communication, and more specifically, to clear channel assessment (CCA) for use in communicating on wireless channels.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

When a wireless communication device such as an AP or a STA has data to transmit via a shared wireless communication medium, the wireless communication device may perform a clear channel assessment (CCA) as part of the contention process for using the shared wireless communication medium. CCA checks are used to determine whether a communication channel is idle or busy. More specifically, a CCA check refers to the use of carrier sensing and energy detection to determine whether a particular frequency range or bandwidth of the wireless communication channel is free or suitable for transmission ("idle") or, conversely, is being used by another wireless communication device or otherwise not available or not suitable for transmission ("busy").

SUMMARY

The systems, methods and devices of this disclosure each have several innovative aspects, no single one of which is solely responsible for the desirable attributes disclosed herein.

One aspect of the subject matter described in this disclosure can be implemented in a wireless communication device. The wireless device comprises: at least one modem; at least one processor communicatively coupled with the at least one modem; and at least one memory communicatively coupled with the at least one processor and storing processor-readable code that, when executed by the at least one processor in conjunction with the at least one modem, is configured to: perform a first clear channel assessment (CCA) check on a primary subchannel of a channel having a total bandwidth greater than or equal to 40 megahertz (MHz), a plurality of subchannels of the channel collectively spanning the total bandwidth of the channel, the channel including the primary subchannel and one or more secondary subchannels, the primary subchannel and the one or more secondary subchannels each having a bandwidth of 20 MHz; perform, on each of the one or more secondary subchannels, a respective second CCA check; and cause a communication to be transmitted on the channel based on a status of each of the primary subchannel and the one or more secondary subchannels that is based on the performance of the respective first or second CCA check.

Another aspect of the subject matter described in this disclosure can be implemented in a method for wireless communication. The method includes performing a first clear channel assessment (CCA) check on a primary subchannel of a channel having a total bandwidth greater than or equal to 40 megahertz (MHz), a plurality of subchannels of the channel collectively spanning the total bandwidth of the channel, the plurality of subchannels including the primary subchannel and one or more secondary subchannels, the primary subchannel and the one or more secondary subchannels each having a bandwidth of 20 MHz; performing, on each of the one or more secondary subchannels, a respective second CCA check; and transmitting a communication on the channel based on a status of each of the primary subchannel and the one or more secondary subchannels that is based on the performance of the respective second CCA check or the first CCA check.

In some aspects, the method further involves determining whether the primary subchannel is idle based on the first CCA check; and determining, for each of the one or more secondary subchannels, whether a respective secondary subchannel is idle based on the respective second CCA check performed on the respective secondary subchannel.

Some such aspects operate where determining whether the primary subchannel is idle comprises an energy detection CCA (CCA-ED) check for the primary subchannel; and where determining for each of the one or more secondary subchannels, whether the respective secondary subchannel is idle comprises a corresponding CCA-ED for each of the one or more secondary subchannels.

Some such aspects operate where the CCA-ED check for the primary subchannel and the corresponding CCA-ED for each of the one or more secondary subchannels each comprise a negative 62 dBm threshold check.

Some such aspects operate where determining whether the primary subchannel is idle further comprises a preamble detection CCA (CCA-PD) check for the primary subchannel; and where determining for each of the one or more secondary subchannels, whether the respective secondary subchannel is idle further comprises a corresponding CCA-PD for each of the one or more secondary subchannels.

Some such aspects operate where the CCA-PD check for the primary subchannel comprises a negative 82 dBm threshold check.

Some such aspects operate where the corresponding CCA-PD for each of the one or more secondary subchannels comprises a threshold of negative 72 dBm.

Some such aspects operate where the channel has a collective bandwidth of 40 MHz, 80 MHz, 160 MHz, or 320 MHz.

In some aspects, the method further involves generating one or more CCA indication reports based on at least one of the first CCA check and the respective second CCA checks, the one or more CCA indication reports including an indication of a status each 20 MHz subchannel of the channel.

Some such aspects operate where the one or more CCA indication reports include a first CCA report for the primary subchannel and at least a second CCA report for the one or more secondary subchannels.

Some such aspects operate where transmitting the communication on the channel includes transmitting data using the channel based on at least one of a determination that the primary subchannel is idle and a determination that the one or more secondary subchannels are idle.

Some such aspects operate where transmitting the communication on the channel includes transmitting data on a puncture set of the primary subchannel and the one or more secondary subchannels in accordance with a preamble puncturing pattern matching corresponding idle values from the first CCA check and the respective second CCA checks. Some such aspects operate where the transmitting the communication on the channel further includes communicating on a first portion of the plurality of subchannels and a second portion of the plurality of subchannels based on a resource unit allocation for the primary subchannel and the one or more secondary subchannels of the channel. Some such aspects operate where the first CCA check has a first CCA threshold of negative 62 dBm. Some such aspects operate where each CCA check of the first CCA check and the respective second CCA checks is performed serially.

Some such aspects operate where the first CCA check, the respective second CCA checks, and transmitting the communication on the channel are performed by an access point (AP) or a mobile station (STA) in a wireless network.

Additional aspects are included in the detailed description below.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Like reference numbers and designations in the various drawings indicate like elements.

DETAILED DESCRIPTION

Figure 1:
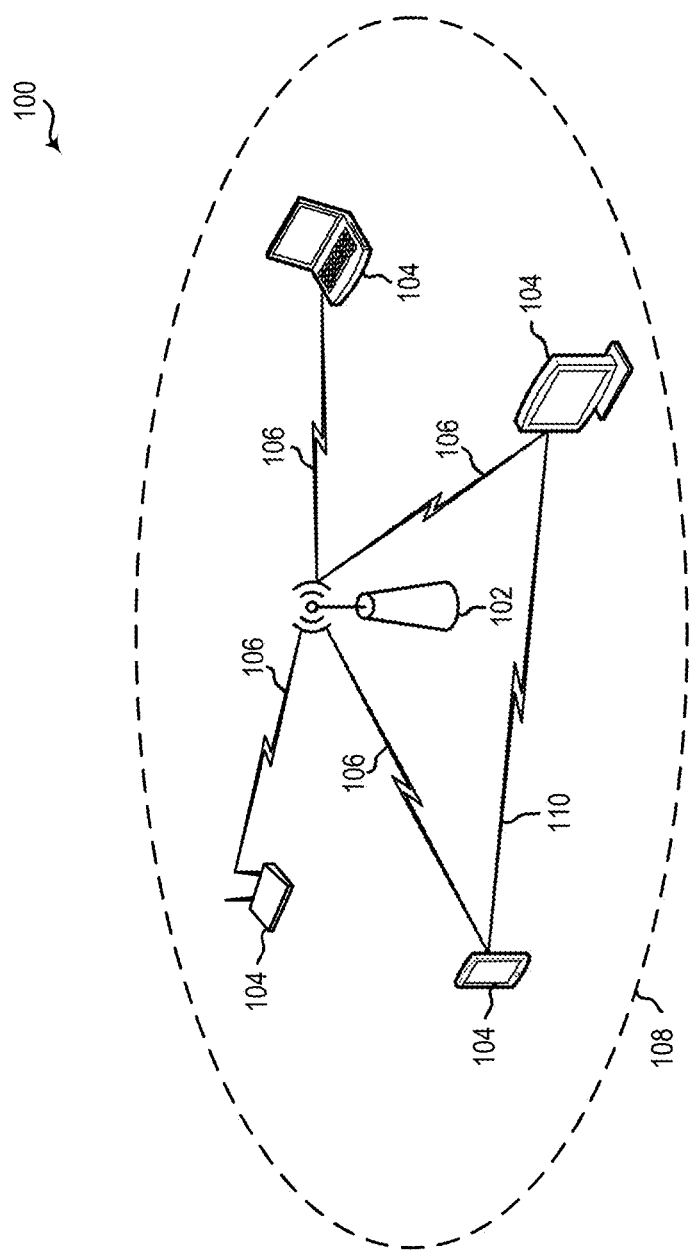
FIG. 1 shows a pictorial diagram of an example wireless communication network.

The following description is directed to some particular examples for the purposes of describing aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3$^{rd}$ Generation Partnership Project (3GPP), among others. The described aspects can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU)-MIMO. The described aspects also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects described herein relate generally to clear channel access (CCA) techniques for wireless communication channels having bandwidths of 240 Megahertz (MHz) or 320 MHz or otherwise greater than 160 MHz (referred to herein as "wide bandwidth channels" or "wideband channels"). For example, such CCA techniques may be used for Extremely High Throughput (EHT) communications, defined or to be defined in the IEEE 802.11be amendment to the IEEE 802.11 wireless communication standard, or future versions of the IEEE 802.11 wireless communication standard. Some aspects described herein more specifically relate to extending legacy CCA techniques (such as those defined in the IEEE 802.11ax amendment to the IEEE 802.11 wireless communication standard) to support wide bandwidth channels, which are larger than the channel bandwidths supported by legacy standards (for example, channels having bandwidths less than or equal to 160 MHz). In some examples, CCA techniques are extended to support one or more secondary bandwidths in addition to a primary 160 MHz or 80 MHz bandwidth. In some such examples, a 320 MHz wide bandwidth channel may be structured or configured as a combination of a primary 160 MHz bandwidth and one or more secondary bandwidths (for example, one 160 MHz bandwidth or two 80 MHz bandwidths). In some other examples, a 240 MHz wide bandwidth channel may be structured as a combination of a primary 160 MHz bandwidth and a secondary 80 MHz bandwidth. In some other examples, a 240 MHz wide bandwidth channel may be structured as a combination of a primary 80 MHz bandwidth and a secondary 160 MHz bandwidth. Other configurations including different sizes and combinations of primary and secondary bandwidths also are contemplated. In some aspects, CCA techniques for the primary bandwidth portions may be extended to support CCA checks for the secondary bandwidth portions.

Some aspects relate to CCA techniques usable to efficiently identify portions of a wide bandwidth channel that are idle. In some aspects, portions of the wide bandwidth channel may be punctured for transmission based on the CCA results. In some examples, when contending for access to a wide bandwidth channel, a transmitting device may perform CCA checks with a 20 MHz bandwidth granularity; that is, the transmitting device may perform a CCA check on each 20 MHz subchannel of the wide bandwidth channel. The transmitting device may then generate or populate a bitmap in which each bit represents a status (for example, busy or idle) of a respective 20 MHz subchannel). The combination of bits in the bitmap collectively indicate the availability for transmission of all portions of the wide bandwidth channel. In some other examples, the transmitting device may perform CCA checks with a 40 MHz bandwidth granularity such that the transmitting device performs a CCA check on each 40 MHz subchannel and such that each bit of the resultant bitmap represents a status of a respective 40 MHz subchannel of the wide bandwidth channel. In some aspects, the bitmaps generated based on the performance of CCA checks on various subchannels or portions of the wide bandwidth channel can then be used to determine a puncturing pattern for a subsequent transmission via the wide bandwidth channel.

In some aspects, a combination of per 20 MHz CCA checks and per 40 MHz CCA checks can be performed on a wide bandwidth channel. For example, a wireless communication device can perform per 20 MHz CCA checks on a primary 160 MHz subchannel (e.g., segment), and can perform per 40 MHz CCA checks on one or more secondary subchannels (for example, 40 MHz CCA checks on a secondary 160 MHz subchannel of a 320 MHz wide bandwidth channel, or 40 MHz CCA checks on a secondary 80 MHz subchannel of a 240 MHz wide bandwidth channel). In some examples, other combinations of CCA checks can be performed on other bandwidths, such as 80 MHz, 160 MHz, or the full wide bandwidth channel bandwidth.

In some examples, the CCA checks can be performed sequentially. In some other examples, the CCA checks can be performed in parallel. In some other examples, some CCA checks can be performed sequentially and other CCA checks can be performed in parallel based on a particular configuration.

Some aspects further relate to the use of multiple primary subchannels in a single wide bandwidth channel. In some examples, a wide bandwidth channel can be structured with 80 MHz or 160 MHz segments (e.g. subchannels), with each segment having an associated primary subchannel and one or multiple secondary subchannels. In some examples, a wide bandwidth channel is structured or configured as a combination of a primary 160 MHz segment and a secondary 160 MHz segment, with each of the 160 MHz segments further structured with one primary 20 MHz subchannel and seven secondary 20 MHz subchannels. In some examples, a wide bandwidth channel can be structured with one 80 MHz primary segment and two secondary 80 MHz segments, and each 80 MHz segment can further be structured with one primary 20 MHz subchannel and three secondary 20 MHz subchannels. In some other examples, other structures or configurations for a wide bandwidth channel and segments of a wide bandwidth channel may be used.

Some aspects relate to power thresholds that may be used by a wireless communication device for performing CCA checks of a wide bandwidth channel. In some examples, a wireless communication device may be configured for low power operations in a low power indoor (LPI) communication mode. In some examples, a wireless communication device may be configured to perform a duplication (DUP) mode, a dual carrier modulation (DCM) mode, or a combination of DUP and DCM modes for low power operation. In some such examples, power thresholds used when operating in such low power modes may be lower than power thresholds used when not operating in such low power modes. For example, a wireless communication device operating in one or more lower power modes (for example, DUP mode, DCM mode, or DUP and DCM modes) can use lower power thresholds (for performing CCA checks) as compared to power thresholds that are used when not operating in the one or more low power modes.

Aspects described herein can be implemented to realize one or more of the following potential advantages. In some examples, the described techniques can be used to enable wide bandwidth channel functionality. In some examples, added signaling indications enable wider bandwidth channels beyond what is available to manage CCA for legacy wireless channels (with a bandwidth less than or equal to 160 MHz). In some examples, the described techniques, including the use of bitmaps, enable flexibility for puncturing communication structures or configurations that increase spectral efficiency of the available frequency resources of the shared wireless medium in use by a wireless communication device. Some such examples can increase frequency resource utilization while increasing efficiency, for example, by increasing a bitmap frequency range to 40 MHz from 20 MHz. The increase to a 40 MHz bitmap can increase efficiency when puncture patterns are applied to bandwidths of at least 40 MHz and 20 MHz and bitmaps give idle information smaller than the smallest puncture bandwidths.

In some examples that include the use of multiple primary subchannels in a single wide bandwidth channel, puncturing transmissions can increase wireless frequency utilization by enabling transmissions on secondary segments of a wide bandwidth channel when the primary segment is busy.

In some aspects, one or more of the techniques described herein can be used to increase the transmission rate of a device while reducing the overhead needed to perform the transmission. In some aspects, one or more of the techniques can decrease the time and resources used when waiting for busy channels to become idle. By enabling wide bandwidth communication channels, the CCA techniques described herein enable increased throughput for wireless communications. The CCA techniques can also improve attenuation (RvR) performance at high bit rates due to a linear-bandwidth versus a signal-to-noise (SNR) ratio tradeoff. CCA techniques described herein can use the SNR ratio tradeoff to improve device performance. In some examples, the CCA techniques described herein for wide bandwidth channels allow tradeoffs between spectral efficiency and complexity, or communication overhead. The CCA techniques described herein can further enable flexibility in selecting operating bandwidths (for example, due to the support of puncturing), which can allow partial use of a wide bandwidth channel when part of the wide bandwidth channel is in use by other devices.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. After association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P₂P) networks. In some cases, ad hoc networks may be implemented within a larger wireless network such as the WLAN 100. In such aspects, while the STAs 104 may be capable of communicating with each other through the AP 102 using communication links 108, STAs 104 also can communicate directly with each other via direct wireless links 110. Two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
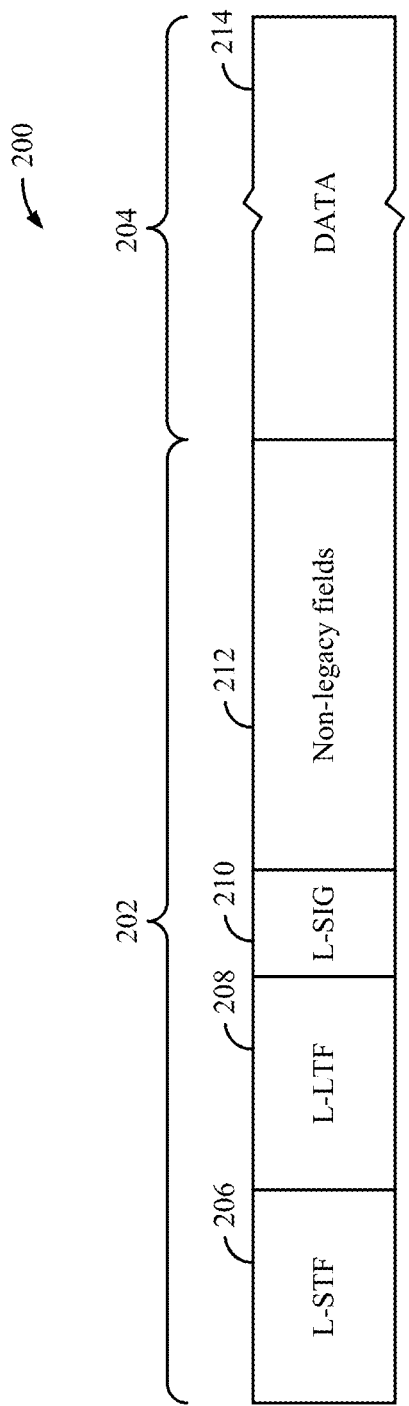
FIG. 2A shows an example protocol data unit (PDU) usable for communications between an access point (AP) and one or more stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
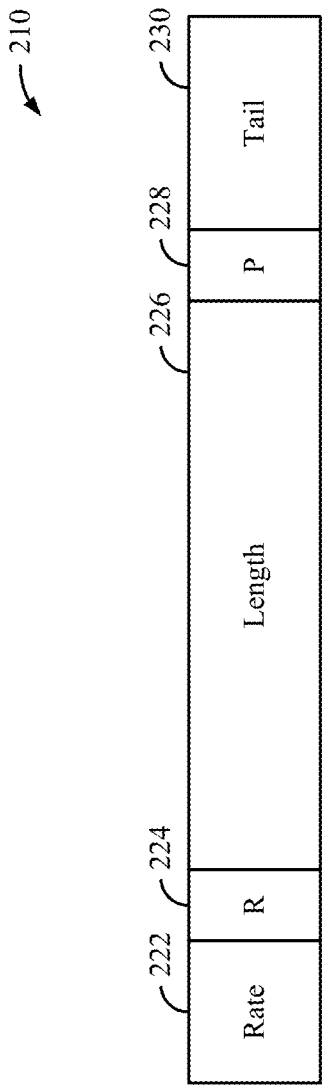
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3A:
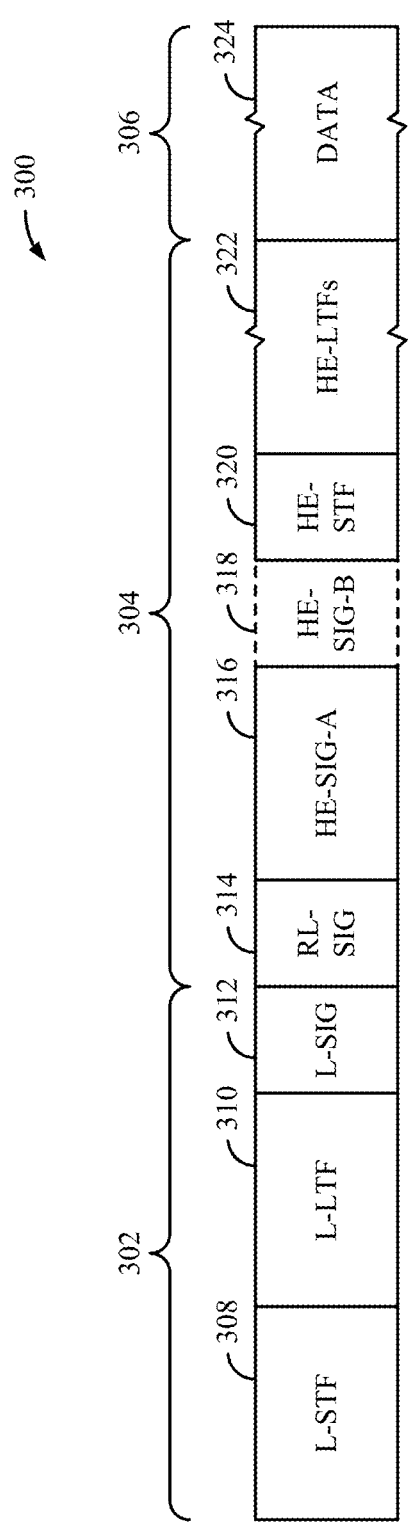
FIG. 3A shows an example PHY layer convergence protocol (PLCP) protocol data unit (PPDU) usable for communications between an AP and one or more STAs.

FIG. 3A shows an example PPDU 300 usable for wireless communication between an AP and one or more STAs. The PPDU 300 may be used for SU, OFDMA or MU-MIMO transmissions. The PPDU 300 may be formatted as a High Efficiency (HE) WLAN PPDU in accordance with the IEEE 802.11ax amendment to the IEEE 802.11 wireless communication protocol standard. The PPDU 300 includes a PHY preamble including a legacy portion 302 and a non-legacy portion 304. The PPDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. HE-STF 320 may be used for timing and frequency tracking and AGC, and HE-LTF 322 may be used for more refined channel estimation. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PPDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
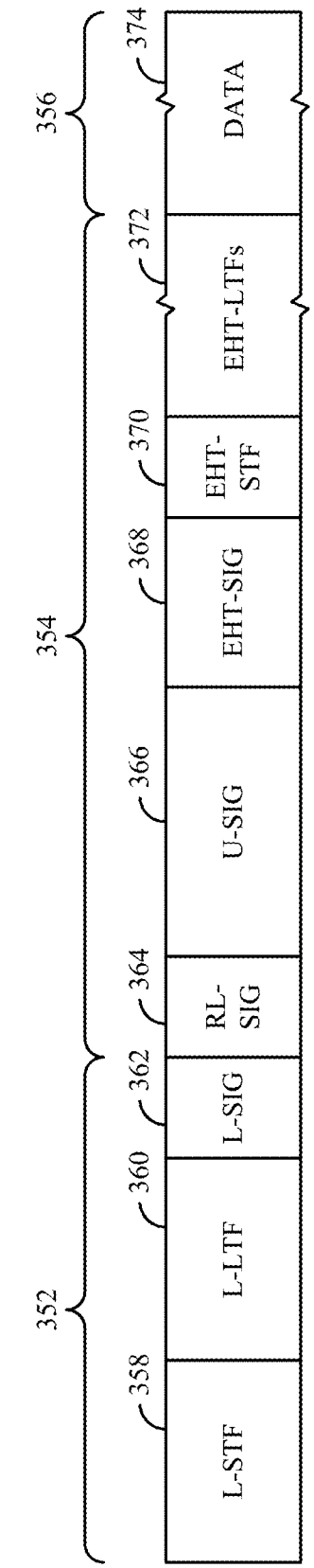
FIG. 3B shows another example PPDU usable for communications between an AP and one or more STAs.

FIG. 3B shows another example PPDU 350 usable for wireless communication between an AP and one or more STAs. The PPDU 350 may be used for SU, OFDMA or MU-MIMO transmissions. The PPDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation. Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it must wait for a particular time and then contend for access to the wireless medium. In some aspects, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the relevant threshold.

As described above, the DCF is implemented through the use of time intervals. These time intervals include the slot time (or "slot interval") and the inter-frame space (IFS). The slot time is the basic unit of timing and may be determined based on one or more of a transmit-receive turnaround time, a channel sensing time, a propagation delay and a MAC processing time. Measurements for channel sensing are performed for each slot. All transmissions may begin at slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be).

When the NAV reaches 0, the wireless communication device performs the physical carrier sensing. If the channel remains idle for the appropriate IFS (for example, the DIFS), the wireless communication device initiates a backoff timer, which represents a duration of time that the device must sense the medium to be idle before it is permitted to transmit. The backoff timer is decremented by one slot each time the medium is sensed to be idle during a corresponding slot interval. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication devices generates a new PPDU for transmission in a new TXOP, it randomly selects a new backoff timer duration. The available distribution of the numbers that may be randomly selected for the backoff timer is referred to as the contention window (CW). If, when the backoff timer expires, the wireless communication device transmits the PPDU, but the medium is still busy, there may be a collision. If there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may then increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, then proceed to initiate the new backoff timer. There are different CW and TXOP durations for each of the four access categories (ACs): voice (AC_VO), video (AC_VI), background (AC_BK), and best effort (AC_BE). The different durations and access categories enable particular types of traffic to be prioritized in the network.

Some APs and STAs may be configured to implement spatial reuse techniques. For example, APs and STAs configured for communications using IEEE 802.11ax or 802.11be may be configured with a BSS color. APs associated with different BSSs may be associated with different BSS colors. If an AP or a STA detects a wireless packet from another wireless communication device while contending for access, the AP or STA may apply different contention parameters based on whether the wireless packet is transmitted by, or transmitted to, another wireless communication device within its BSS or from a wireless communication device from an overlapping BSS (OBSS), as determined by a BSS color indication in a preamble of the wireless packet. For example, if the BSS color associated with the wireless packet is the same as the BSS color of the AP or STA, the AP or STA may use a first received signal strength indication (RSSI) detection threshold when performing a CCA on the wireless channel. However, if the BSS color associated with the wireless packet is different than the BSS color of the AP or STA, the AP or STA may use a second RSSI detection threshold in lieu of using the first RSSI detection threshold when performing the CCA on the wireless channel, the second RSSI detection threshold being greater than the first RSSI detection threshold. In this way, the requirements for winning contention are relaxed when interfering transmissions are associated with an OBSS.

Figure 4:
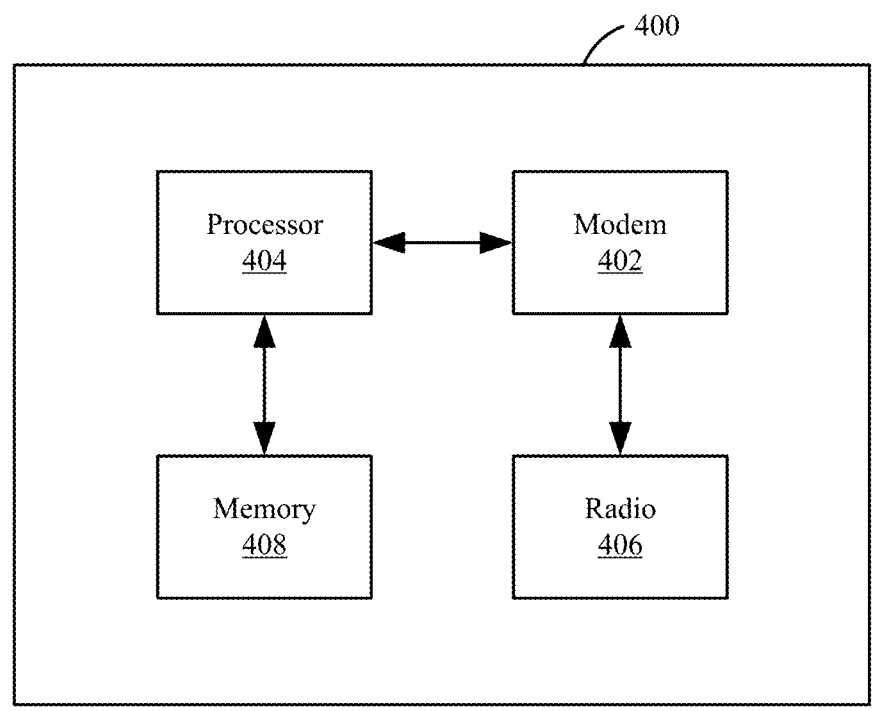
FIG. 4 shows a block diagram of an example wireless communication device.

FIG. 4 shows a block diagram of an example wireless communication device 400. In some aspects, the wireless communication device 400 can be an example of a device for use in a STA such as one of the STAs 104 described above with reference to FIG. 1. In some aspects, the wireless communication device 400 can be an example of a device for use in an AP such as the AP 102 described above with reference to FIG. 1. The wireless communication device 400 is capable of transmitting and receiving wireless communications in the form of, for example, wireless packets. For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some aspects, the one or more modems 402 (collectively "the modem 402") additionally include a WWAN modem (for example, a 3GPP 4G LTE or 5G compliant modem). In some aspects, the wireless communication device 400 also includes one or more processors, processing blocks or processors 404 (collectively "the processor 404") coupled with the modem 402. In some aspects, the wireless communication device 400 additionally includes one or more radios 406 (collectively "the radio 406") coupled with the modem 402. In some aspects, the wireless communication device 400 further includes one or more memory blocks or elements (collectively "the memory 408") coupled with the processor 404 or the modem 402.

The modem 402 can include an intelligent hardware block or device such as, for example, an application-specific integrated circuit (ASIC), among other examples. The modem 402 is generally configured to implement a PHY layer, and in some implementations, also a portion of a MAC layer (for example, a hardware portion of the MAC layer). For example, the modem 402 is configured to modulate packets and to output the modulated packets to the radio 406 for transmission over the wireless medium. The modem 402 is similarly configured to obtain modulated packets received by the radio 406 and to demodulate the packets to provide demodulated packets. In addition to a modulator and a demodulator, the modem 402 may further include digital signal processing (DSP) circuitry, automatic gain control (AGC) circuitry, a coder, a decoder, a multiplexer and a demultiplexer. For example, while in a transmission mode, data obtained from the processor 404 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 406. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 406, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 404) for processing, evaluation or interpretation.

The radio 406 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some aspects, the wireless communication device 400 can include, or be coupled with, multiple transmit antennas (each with a corresponding transmit chain) and multiple receive antennas (each with a corresponding receive chain). The symbols output from the modem 402 are provided to the radio 406, which then transmits the symbols via the coupled antennas. Similarly, symbols received via the antennas are obtained by the radio 406, which then provides the symbols to the modem 402.

The processor 404 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 404 processes information received through the radio 406 and the modem 402, and processes information to be output through the modem 402 and the radio 406 for transmission through the wireless medium. For example, the processor 404 may implement a control plane and at least a portion of a MAC layer configured to perform various operations related to the generation, transmission, reception and processing of MPDUs, frames or packets. In some aspects, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some aspects, the processor 404 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 404, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
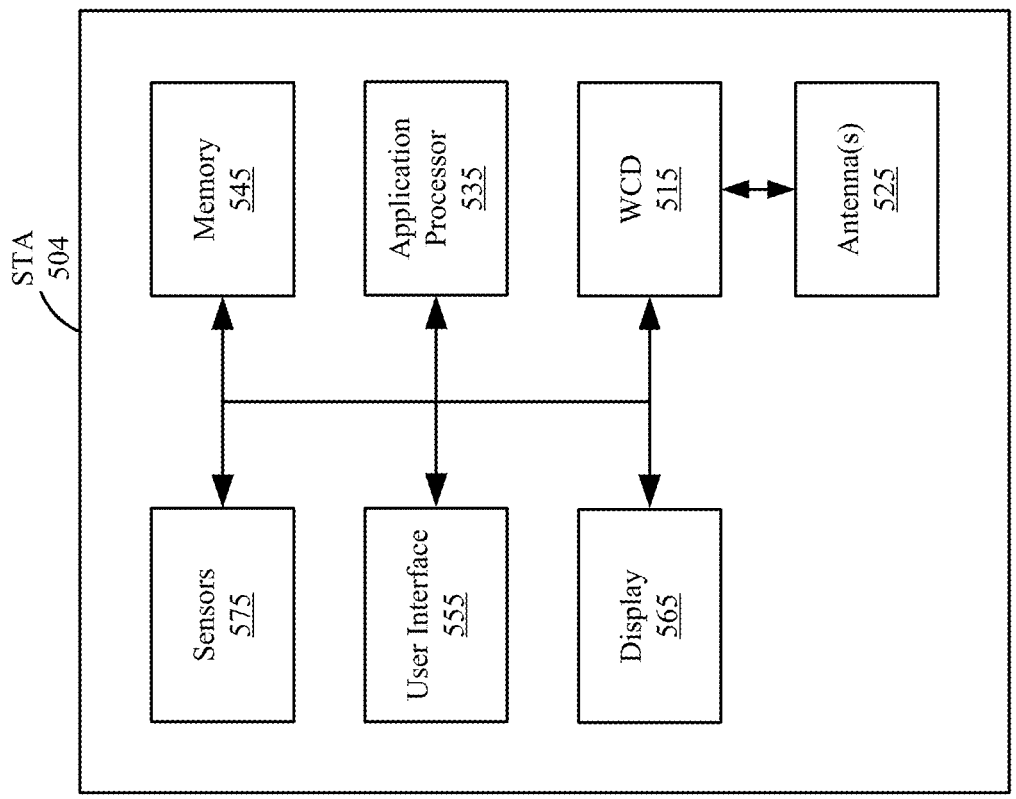
FIG. 5B shows a block diagram of an example station (STA).
Figure 5A:
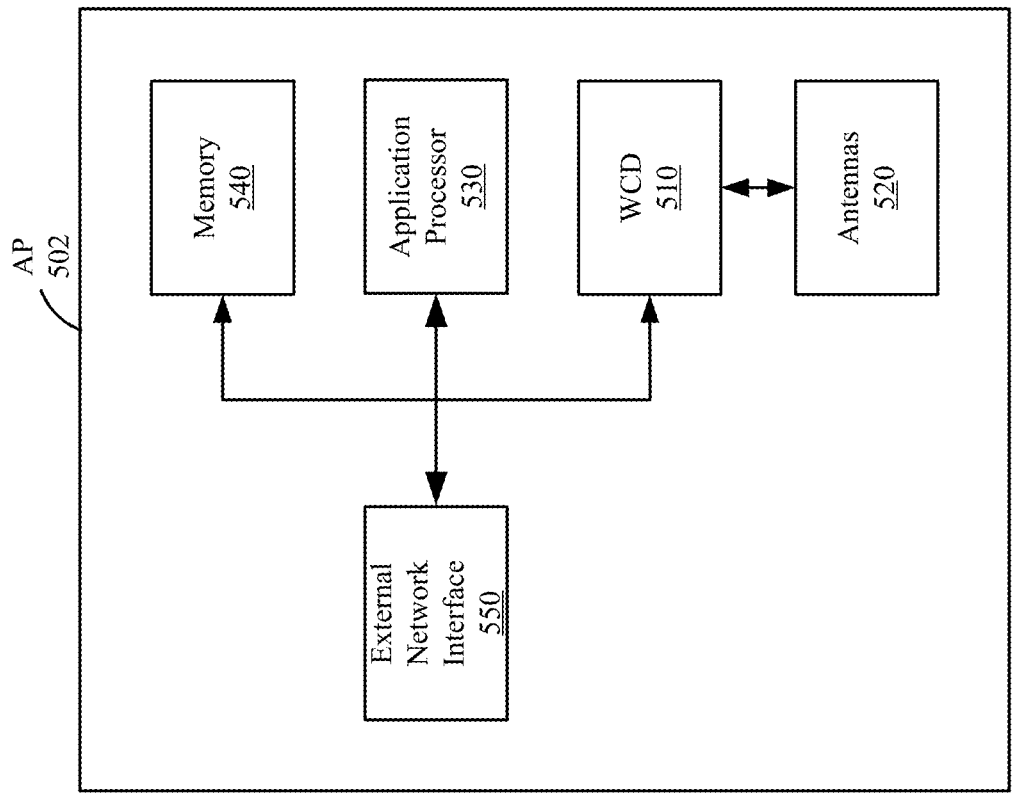
FIG. 5A shows a block diagram of an example access point (AP).

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some aspects, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some aspects, the STA 504 further includes a user interface (UI) 555 (such as a touchscreen or keypad) and a display 565, which may be integrated with the UI 555 to form a touchscreen display. In some aspects, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, a frequency band, such as the 6.4 GHz, 5 GHz, or 6 GHz frequency bands, may have channels defined within the frequency band. These values describe a range of frequencies around the given frequency value which are part of the band identified by a specific frequency number. Each frequency band may have a uniform subchannel bandwidth, such as 20 MHz that is used to cover a total bandwidth associated with a given frequency band. As described above, some WLAN devices are capable of transmitting at higher bandwidths by concurrently using multiple subchannels (referred to as "channel bonding"), allowing the devices to use the subchannels efficiently with shared signaling overhead. By increasing the number of subchannels bonded into a channel, larger bandwidth channels (referred to as wide bandwidth channels) can be created. Such wide bandwidth channels can increase efficiency by limiting the signaling used and increasing the signaling efficiency of the frequency band. As channel bandwidth increases, the complexity of channel access and contention with other devices to use the channel can increase. Larger channel bandwidths can lead to complexities both with limits on transmission power and fairness in sharing access to frequency band resources between different devices, in addition to the basic issues with implementing structures to enable wide bandwidth channels.

Legacy systems include support for smaller bandwidth channels in different clear channel assessment (CCA) modes. Full CCA in such modes includes energy detection and preamble detection CCA checks across a given combination of channel bandwidths to determine if the channel is busy or idle, along with a random backoff when the CCA results in an idle indication. These legacy CCA modes can include non-puncturing transmission modes with poor spectral efficiency and less flexibility in an operating bandwidth selection. The legacy CCA modes can also include a per 20 MHz puncturing transmission mode. The per 20 MHz puncturing transmission mode allows increased spectral efficiency, but uses hardware resources and has additional overhead in the form of a more complex preamble in transmissions. A third mode includes a trigger-based PPDU mode. The third mode can include a per 20 MHz bitmap with short interframe space (SIFS) CCA checks. The third mode can include enhanced distributed channel access on each 20 MHz subchannel and uses only an energy detection threshold without a preamble detection CCA threshold, though the third mode does not qualify as an independent full CCA check for normal channel contention and access.

Various aspects described herein address the above issues as related generally to CCA modes and operations to enable wireless communications using wide bandwidth channels at or above 240 MHz bandwidths.

Figure 6:
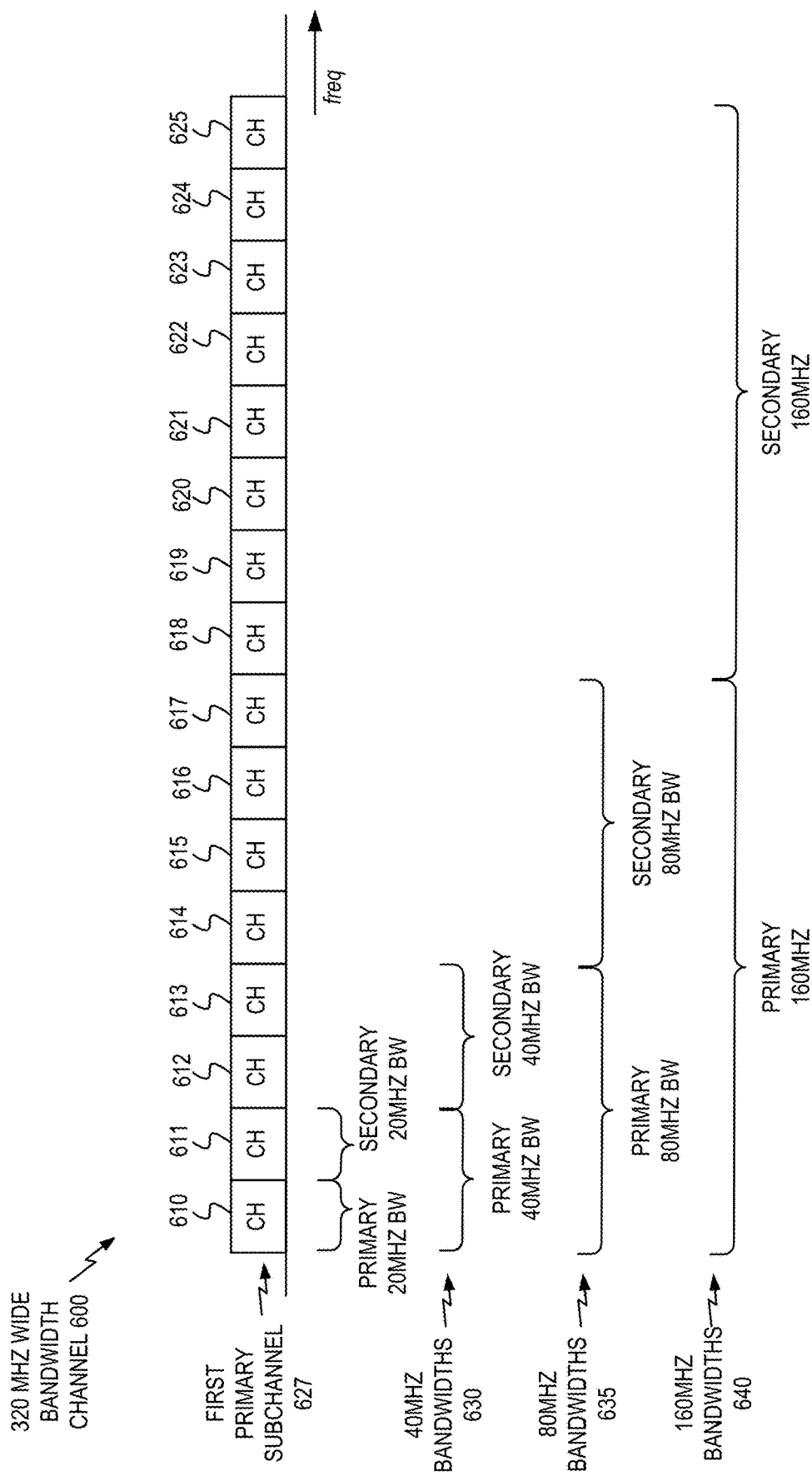
FIG. 6 illustrates aspects of a wide bandwidth channel and clear channel assessment (CCA) configured for wide bandwidth channels, in accordance with some examples.

FIG. 6 illustrates aspects of a wide bandwidth channel and clear channel assessment (CCA) configured for wide bandwidth channels in accordance with some examples. In the example of FIG. 6, a wide bandwidth channel 600 has a 320 MHz total bandwidth resulting from the bonding or aggregation of sixteen smaller 20 MHz bandwidth subchannels shown as subchannels 610, 611, 612, 613, 614, 615, 616, 617, 618, 619, 620, 621, 622, 623, 624, and 625. Although depicted as contiguous channels in the channel mapping shown in FIG. 6, in some aspects, the combined subchannels that make up the wide bandwidth channel 600 may contain subchannels that are non-contiguous.

The 320 MHz wide bandwidth channel 600 may be segmented in a number of ways to define at least one primary subchannel and at least one secondary channel. In the aspect of FIG. 6, subchannel 610 is configured as a first primary subchannel 627. All other subchannels are secondary subchannels. The subchannels can also be grouped in bandwidths of multiple subchannels. As shown, the groupings can include 40 MHz bandwidths 630, 80 MHz bandwidths 635, and 160 MHz bandwidths 640. Bandwidths that include a 20 MHz primary subchannel are designated as primary bandwidths, and bandwidths that do not include a primary subchannel are secondary bandwidths. Subchannels 610 and 611, for example, make up a primary 40 MHz bandwidth, and subchannels 612 and 613 make up a secondary 40 MHz bandwidth. The remaining additional pairings of subchannels in the configuration shown also make up secondary 40 MHz bandwidths. Subchannels 614 and 615 for example, make up an additional secondary 40 MHz bandwidth.

Similar to the 40 MHz bandwidths, subchannels 610, 611, 612, and 613 then make up a primary 80 MHz bandwidth and the remaining three groupings of four subchannels each make up a secondary 80 MHz bandwidth. A primary 160 MHz bandwidth of 160 MHz bandwidths 640 is made up of the bandwidths from the first eight subchannels 610, 611, 612, 613, 614, 615, 616, and 617. The remaining subchannels make up the secondary 160 MHz bandwidth of the 320 MHz wide bandwidth channel 600.

The CCA techniques in this disclosure may be performed by any type of WLAN device, including an AP or a STA. The following describes CCA operations implemented with serial CCA checks in accordance with some examples. Some alternative examples are described further below. In various aspects, when performing a CCA process, a wireless communication device (or a PHY layer of the wireless communication device) begins CCA operations by performing a CCA check on primary subchannel 627 defined in a list of bandwidths or channels that are to be subject to CCA checks for the wide bandwidth channel 600. The CCA check may indicate that the primary subchannel is either busy or idle. The idle status can also be referred to as a "clear" status. The busy status can also be referred to as an "occupied" status.

If the CCA check metric on the primary subchannel is below a signal detection threshold, an idle value is assigned for the subchannel. The CCA check can include an energy detection threshold that can identify signals other than 802.11 signals, as well as a preamble detection threshold that specifically checks for IEEE 802.11 signals. Examples of various signal and signal detection thresholds are shown below in tables 1, 2, and 3. In some implementations, if the CCA check detects a signal through energy detection or a packet through packet detection on the primary subchannel 627, then an indication that the wide bandwidth channel 600 is busy is generated. For serial CCA checks, the CCA process can halt and return an indication that the wide bandwidth channel is busy. A PHY layer performing the CCA checks can send such an indication to the MAC layer.

Otherwise, if the primary subchannel 627 is clear, the PHY layer may perform a CCA check on a secondary subchannel, for example, the secondary 20 MHz bandwidth subchannel 611. If subchannel 611 is clear, the CCA process has identified the primary 40 MHz bandwidth as clear, and proceeds with a CCA check for the secondary 40 MHz bandwidth that is part of the primary 80 MHz bandwidth. If the secondary 40 MHz bandwidth is clear, the secondary 80 MHz bandwidth that is part of the primary 160 MHz bandwidth is subject to a CCA check. At this point, a CCA has been performed on a 160 MHz bandwidth. The CCA can be extended past the 160 MHz bandwidth to a bandwidth greater than or equal to 240 MHz in a variety of ways. In one example, a CCA check can then be performed on the secondary 160 MHz bandwidth shown in FIG. 6, so the final two CCA checks of the CCA process include CCA checks for the two bandwidths of 160 MHz bandwidths 640. If the secondary 160 MHz bandwidth is clear, then the 320 MHz wide bandwidth channel 600 is idle and available for use (for example, available for transmission) by the wireless communication device performing the CCA.

In the example above, if a signal exceeding a CCA threshold is detected at any point for any CCA check, the 320 MHz wide bandwidth channel is identified as busy, and a contention backoff timer can be initiated prior to a subsequent CCA. In such cases, the PHY layer of the wireless communication device may send an indication to a MAC layer that the 320 MHz wide bandwidth channel 600 is busy, and the MAC layer can handle the subsequent contention operations, such as managing a timer, initiating a subsequent CCA to be performed by the PHY layer, or other operation.

The example above is one possible aspect of CCA extension to a wide bandwidth channel. In some implementations supporting a wide bandwidth channel, the CCA process is extended from the first 160 MHz bandwidth channel (the primary 160 MHz bandwidth channel) to a secondary 160 MHz bandwidth channel using only a single additional CCA operation as described above. In some other implementations supporting a 320 MHz bandwidth channel such as channel 600, if the secondary 80 MHz bandwidth channel is clear, the PHY layer may then extend the CCA to include an additional check for the remaining bandwidths using additional secondary 80 MHz bandwidths. Additional examples, such as the use of per 20 MHz CCA checks, per 40 MHz CCA checks, and one or more secondary primary subchannels each having associated secondary primary bandwidths, are described below.

As described above, CCA checks performed as part of a CCA process include CCA thresholds for determining whether a particular part of a wide bandwidth channel is busy or idle. Table 1 below illustrates an example set of CCA thresholds that can be used in some aspects described herein.

TABLE 1

| Primary channel sizes | CCA threshold (detection threshold) |
|---|---|
| Energy detection in primary 20 MHz | −62 dBm |
| Preamble detection of the start of WLAN signal in primary 20 MHz | −82 dBm |
| Preamble detection of the start of WLAN signal in primary 40 MHz | −79 dBm |
| Preamble detection of the start of WLAN signal in primary 80 MHz | −76 dBm |
| Preamble detection of the start of WLAN signal in primary 160 MHz | −73 dBm |
| Preamble detection of the start of WLAN signal in 240 MHz, or 160 + 80, 80 + 160, 3 × 80 MHz | −71 dBm |
| Preamble detection of the start of WLAN signal in 320 MHz, or 160 + 160 MHz | −70 dBm |

Table 1 includes thresholds that can be used for performing physical carrier sensing on a primary subchannel or bandwidth according to some aspects. The example thresholds are described in units of decibel-milliwatts (dBm). In other examples, other threshold units can be used. The examples in table 1 are illustrative examples, and other thresholds may be used in other instances or applications. For example, the signal detection threshold for a wide bandwidth channel having a 240 MHz bandwidth may be −71 dBm. In another example, the signal detection threshold for a wide bandwidth channel having a 320 MHz bandwidth may be −70 dBm.

Table 2 below shows a chart of thresholds for use in performing physical carrier sensing (PD detection) on one or more bandwidths.

TABLE 2

| Secondary channel sizes | WLAN signal (packet detection threshold) | Non-WLAN signal (signal detection threshold) |
| --- | --- | --- |
| Any 20 MHz bandwidth not containing a primary subchannel | Max (−72 dBm, OBSS_PD) | −62 dBm |
| Any 40 MHz bandwidth not containing a primary subchannel | Max (−72 dBm, OBSS_PD + 3) | −59 dBm |
| Any 80 MHz bandwidth not containing a primary subchannel | Max (−69 dBm, OBSS_PD + 6) | −56 dBm |
| Any 160 MHz bandwidth not containing a primary subchannel | Max (−66 dBm, OBSS_PD + 9) | −53 dBm |

While table 2 includes illustrative examples, other thresholds may be used in other instances or applications. For example, the signal detection threshold for secondary 80 MHz bandwidth may be −69 dBm. The packet detection threshold for the tertiary 80 MHz bandwidth channel and the quaternary 80 MHz bandwidth channel may be −56 dBm. If a secondary 160 MHz bandwidth channel is defined, the signal detection threshold for that secondary channel may be −66 dBm (and the packet detection threshold may be −53 dBm). In addition to having different CCA thresholds, CCA checks on secondary bandwidths can, in some aspects, include less than a full random backoff in an idle indication for a secondary bandwidth is identified. Some aspects can use SIFS CCA checks, point coordination function (PCF) interframe space (PIFS) CCA checks, or other such checks without a full random backoff in accordance with examples described herein.

In some aspects, start of packet CCA checks are performed for a primary 20 MHz subchannel and each 20 MHz subchannel up to a total 320 MHz bandwidth of a channel. In some aspects, a PD check has a threshold for primary 20 MHz detection at or above negative 82 decibels (dBm). In some aspects, CCA is defined for non-primary 20 MHz detection with a threshold defined for packet detection (e.g., PD) for each subchannel of a channel (e.g., for 16 20 MHz subchannels in a 320 MHz channel). In some aspects, the CCA threshold for non-primary CCA checks is detection at or above negative 72 dBm for PD checks. In some aspects, the CCA threshold is at or above negative 62 dBm for each primary and non-primary 20 MHz subchannel ED checks. In some aspects, per 20 MHz subchannel check are performed with a single threshold of negative 72 dB for WLAN signal levels captured on each 20 MHz of a channel.

In various aspects, the set of CCA thresholds used by a wireless communication device can be stored in a memory of the device, and compared against measurements taken as part of a particular CCA check for CCA operations as described herein. In some aspects, these CCA thresholds can be implemented by a network interface as described below.

Figure 7:
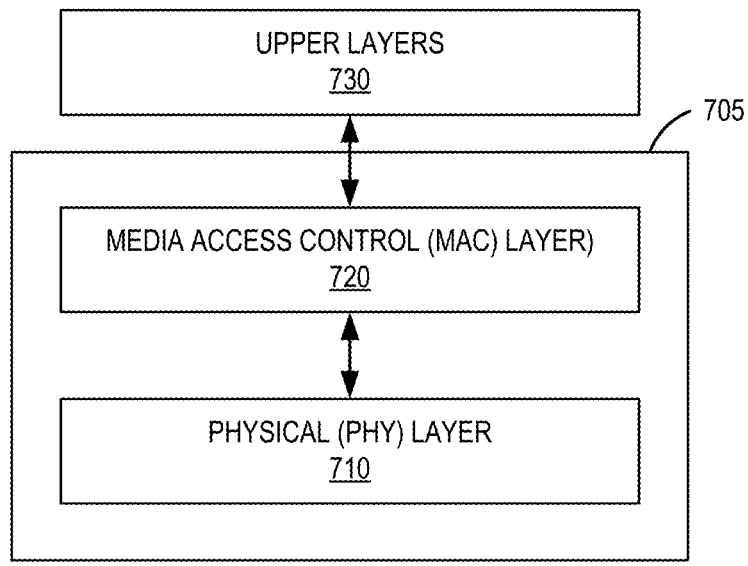
FIG. 7 shows example layers of a network interface including a physical (PHY) layer and a media access control (MAC) layer that can be used for CCA configured for wide bandwidth channels, in accordance with some aspects.

FIG. 7 shows example layers of a network interface, including a physical (PHY) layer 710 and a media access control (MAC) layer 720. The PHY layer 710 and the MAC layer 720 can be used for CCA configured for wide bandwidth channels in accordance with various examples described herein. The PHY layer 710 may communicate one or more CCA indicators to the MAC layer 720 to indicate whether a wide bandwidth channel is available ("idle" or "clear") or not available ("busy"). In some aspects, the PHY layer 710 may perform CCA on the wide bandwidth channel in response to a CCA trigger indicator provided from the MAC layer 720 to the PHY layer 710. The MAC layer 720 may manage data (that is to be transmitted) from upper layers 730 to the PHY layer 710, or may pass received data from the PHY layer 710 to the upper layers 730. The upper layers 730 may be part of the network interface 705 or may be part of a host device in which the network interface 705 is installed.

Figure 8:
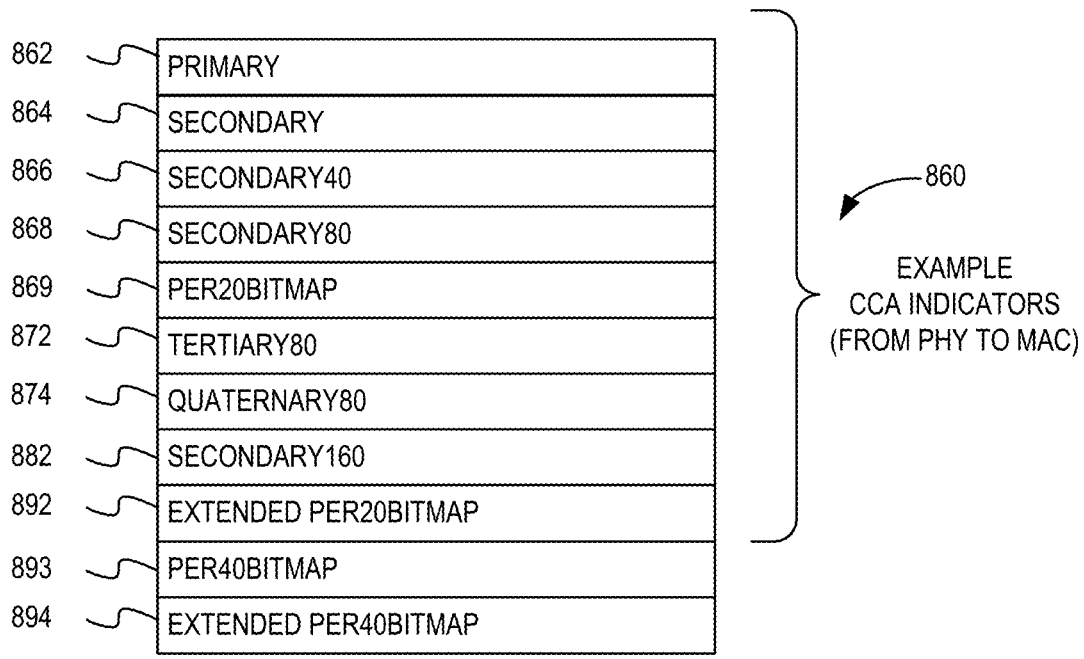
FIG. 8 shows example CCA indicators that may be communicated from a PHY layer to a MAC layer used for CCA configured for wide bandwidth channels, in accordance with some aspects.

FIG. 8 shows example clear channel assessment (CCA) indicators that may be communicated from a PHY layer to a MAC layer that can be used for CCA configured for wide bandwidth channels in accordance with some aspects. FIG. 8 particularly shows example CCA indicators 860 that may be communicated from a PHY layer to a MAC layer. A primary indicator 862, which may be referred to as a primary20 or primary subchannel indicator, may indicate whether the primary 20 MHz bandwidth channel is busy. A secondary indicator 864, which may be referred to as a secondary20 indicator or a secondary subchannel indicator, may indicate whether the secondary channel is busy. A secondary40 indicator 866 may indicate whether a secondary 40 MHz bandwidth channel is busy. A secondary80 indicator 868 may indicate whether a secondary 80 MHz bandwidth channel is busy. A per20bitmap indicator 869 may include bits to indicate the busy/idle status of each 20 MHz subchannel of a primary 160 MHz of a wide bandwidth channel or of each 20 MHz subchannel of the entire wide bandwidth channel with a bandwidth greater than or equal to 240 MHz.

In some aspects, the example CCA indicators above may be expanded to include additional types of indicators. For example, additional secondary bandwidth indicators can be added, such as tertiary80 indicator 872 and quaternary80 indicator 874. These indicators can allow independent signaling for multiple secondary bandwidths such as a configuration with three secondary 80 MHz bandwidths. Similarly, a secondary160 indicator 882 may indicate that a secondary 160 MHz bandwidth channel is busy. An extended per20bitmap indicator 892 may include additional bits to indicate the busy or idle status of each 20 MHz subchannel beyond those the first 160 MHz portion of a wide bandwidth channel. Similarly, a per40bitmap 893 and an extended per40bitmap 894 can include bits to indicate a busy or idle status of each 40 MHz subchannel in different parts of a wide bandwidth channel such as channel 600. The use of multiple bitmap indicators can allow different parts of a wide bandwidth channel to have different per bandwidth CCA checks. For example, as described below, in some aspects, a primary 160 MHz bandwidth can be subject to per 20 MHz CCA checks, and a secondary 160 MHz bandwidth can be subject to per 40 MHz CCA checks. Structures that allow configuration of a per bandwidth bitmap for less than a total bandwidth of a wide bandwidth channel prevent redundancy, reduce overhead, and increase signaling efficiency when some CCA checks are not used for some portions of a wide bandwidth channel. The above indicators are examples, and additional configurations of indicators can be used to match a particular CCA and the associated CCA checks for a particular aspect.

Figure 9:
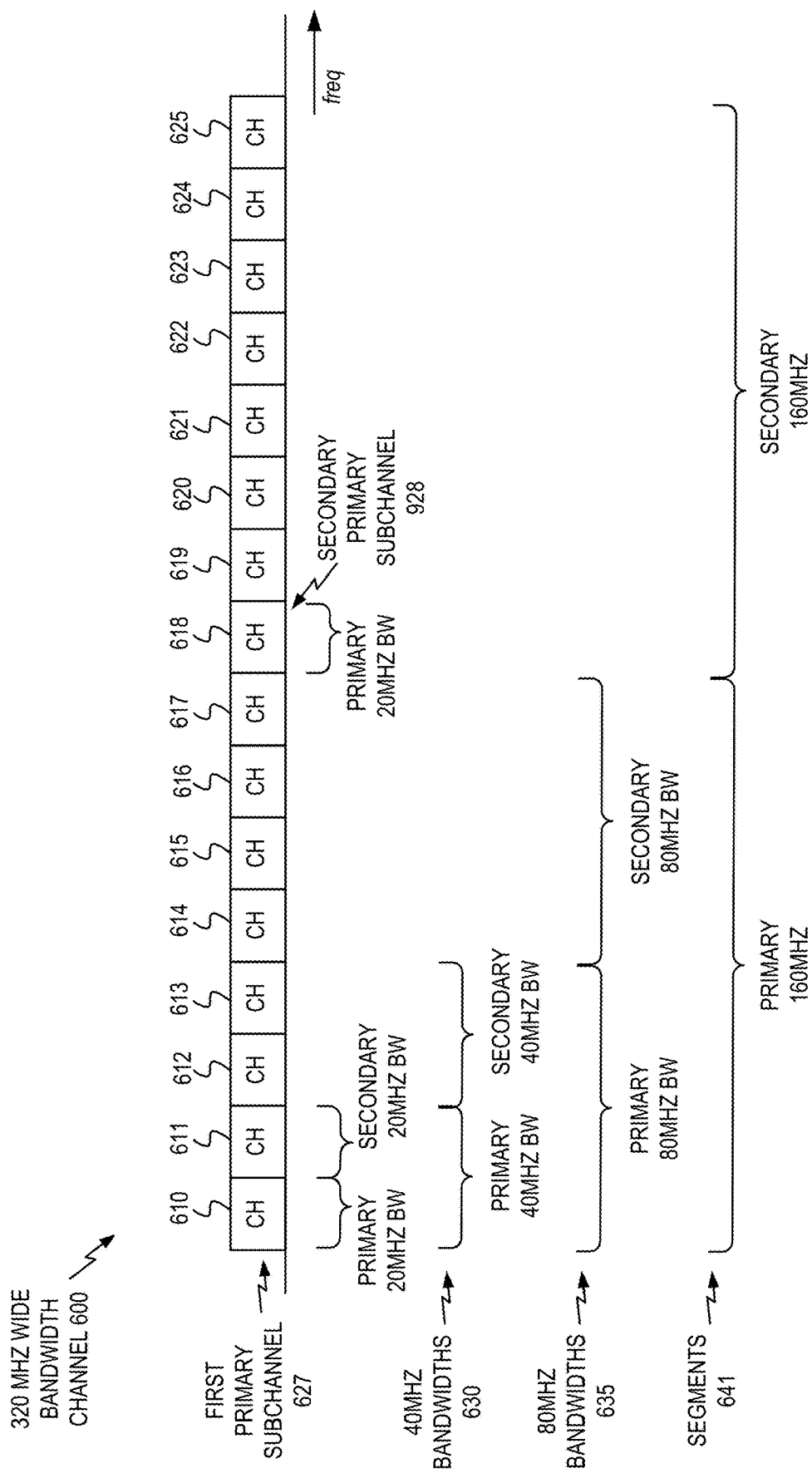
FIG. 9 illustrates aspects of a wide bandwidth channel with CCA configured for wide bandwidth channels, in accordance with some examples.

FIG. 9 illustrates aspects of a wide bandwidth channel with CCA configured for wide bandwidth channels in accordance with some examples. FIG. 9 shows the same 320 MHz wide bandwidth channel 600 from FIG. 6, but the CCA configuration applied to channel 600 as illustrated in FIG. 9 includes a plurality of primary channels. In addition to the subchannel 610 being designated as a first primary subchannel 627, just as in FIG. 6, in FIG. 9, subchannel 618 is assigned as a secondary primary subchannel 928. Assigning a secondary primary subchannel 928 allows the parts of the 320 MHz wide bandwidth channel 600 with primary subchannels to operate independently as segments 641. In FIG. 9, the primary 160 MHz bandwidth operates as a primary segment of segments 641 using the first primary subchannel 627. The secondary 160 MHz bandwidth operates as a secondary segment of segments 641 using secondary primary subchannel 928. Although not shown, the secondary segment can then include secondary primary bandwidths at each bandwidth range, including the 40 MHz bandwidths 630 and the 80 MHz bandwidths 635. As described above, a 160 MHz bandwidth of a wide bandwidth channel can be configured with a CCA with checks for each primary bandwidth. By assigning the secondary primary subchannel, the process described above can be performed for the primary 160 MHz segment to identify an idle or busy status for the primary segment, and then the same set of checks can be performed for the secondary 160 MHz segment. The secondary 160 MHz checks can involve a CCA check for each of the secondary primary subchannel 928, a secondary 40 MHz bandwidth, and a secondary 80 MHz bandwidth, resulting in CCA checks for the entire secondary 160 MHz segment.

Figure 10:
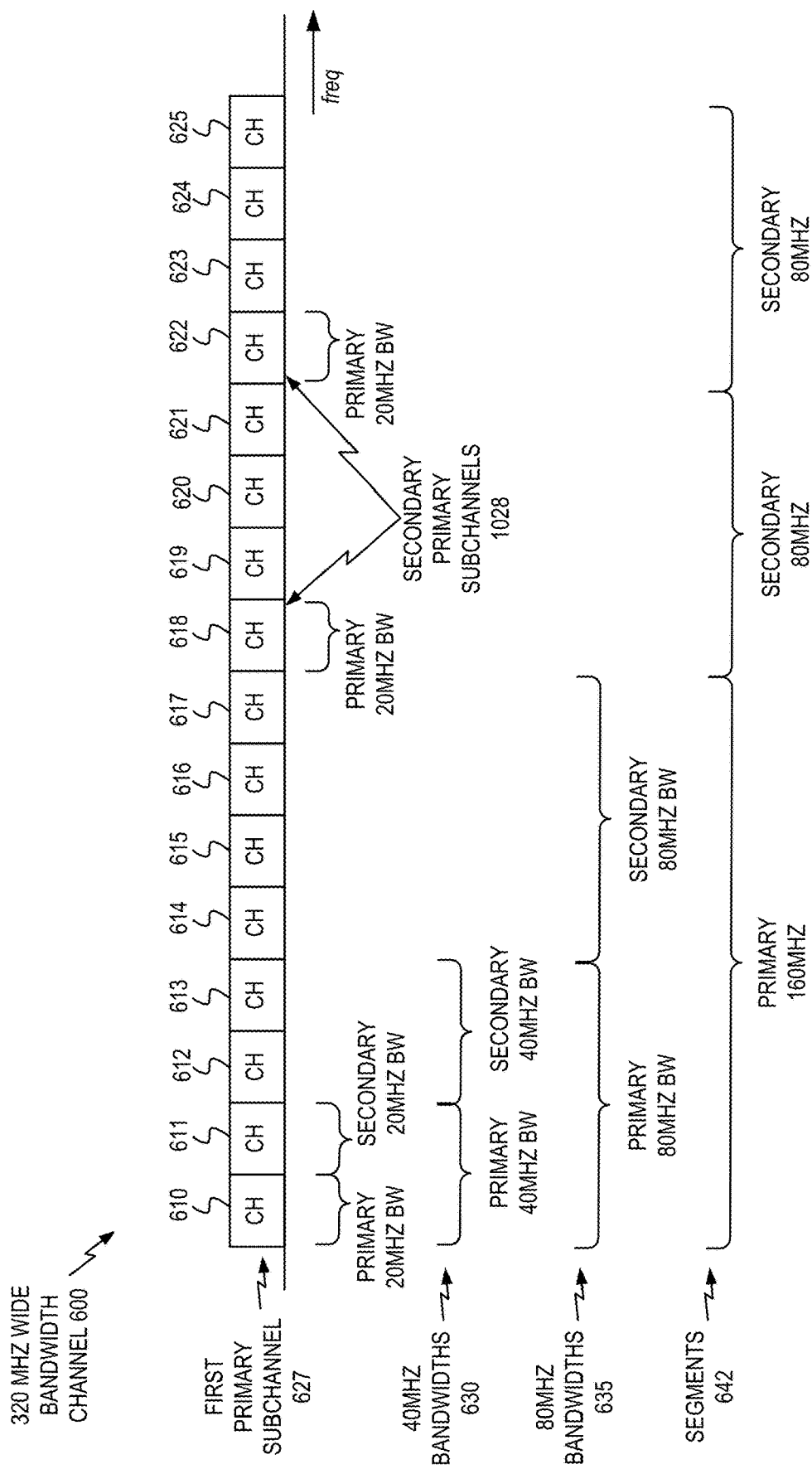
FIG. 10 illustrates aspects of a wide bandwidth channel with CCA configured for wide bandwidth channels, in accordance with some examples.

FIG. 10 illustrates aspects of a wide bandwidth channel with CCA configured for wide bandwidth channels in accordance with some examples. In particular, FIG. 10 illustrates a CCA configuration similar to that of FIG. 9, but with multiple secondary primary subchannels 1028. Just as above, in FIG. 9, each bandwidth including a primary subchannel can operate as an independent segment. Rather than two segments 641 as in FIG. 9, FIG. 10 includes three segments 642, with a primary 160 MHz segment and two secondary 80 MHz segments. In some examples, the second secondary segment can be referred to as a tertiary segment. Some examples can operate with three secondary primary channels and four segments. In such examples, the third secondary segment can be referred to as a quaternary segment.

In some CCA aspects with a configuration as described above for FIG. 10, the CCA checks for the primary 160 MHz segment can be performed as described above, with an initial CCA check on the bandwidth of the first primary subchannel 627, and then serial CCA checks on the secondary bandwidths from 20 MHz through 80 MHz to cover the entire 160 MHz of the primary segment. The same pattern can then be followed for each secondary segment, with an initial CCA check for the primary 20 MHz bandwidth, and serial CCA checks for the associated secondary 20 MHz bandwidth and the secondary 40 MHz bandwidth, covering the entire 80 MHz segment.

Configuring CCA with multiple primary subchannels allows each segment of segments 641 or 642 to have the associated CCA checks performed independently. Because of the CCA check independence, while the CCA checks within a segment are performed serially, in some aspects, the CCA checks for different segments can be performed independently or in parallel. In one example for FIG. 10, CCA checks for subchannels 610, 618, and 622 can be performed in parallel. If the CCA check for subchannel 618 results in a busy value, but subchannels 610 and 622 each return idle results, then the secondary segment including subchannel 618 is assigned a busy value, but the CCA checks for secondary bandwidths of the other segments including subchannels 610 and 622 continue until each segment is identified as clear or busy. Idle segments can then be used for transmissions, while busy segments can have a timer applied prior to a subsequent set of CCA checks. Be defining segments with primary subchannels so that the wide bandwidth channel includes multiple primary subchannels, greater spectral efficiency can be achieved by using portions of the wide bandwidth channel when some, but not all bandwidths within the channel are busy and in use by other devices.

Such use of portions of a channel can be referred to as puncturing, where portions of a total bandwidth are "punctured" to allow use of part of the channel. An alternative to the use of multiple primary subchannels is to signal puncturing patterns in a PPDU preamble, as described in more detail below, particularly with respect to FIGS. 13 and 14. The examples of FIGS. 9 and 10 can increase wireless communication device performance by implementing puncturing without the signaling overhead needed to signal puncturing patterns, at the cost of additional overhead for the additional primary subchannel use.

Figure 11:
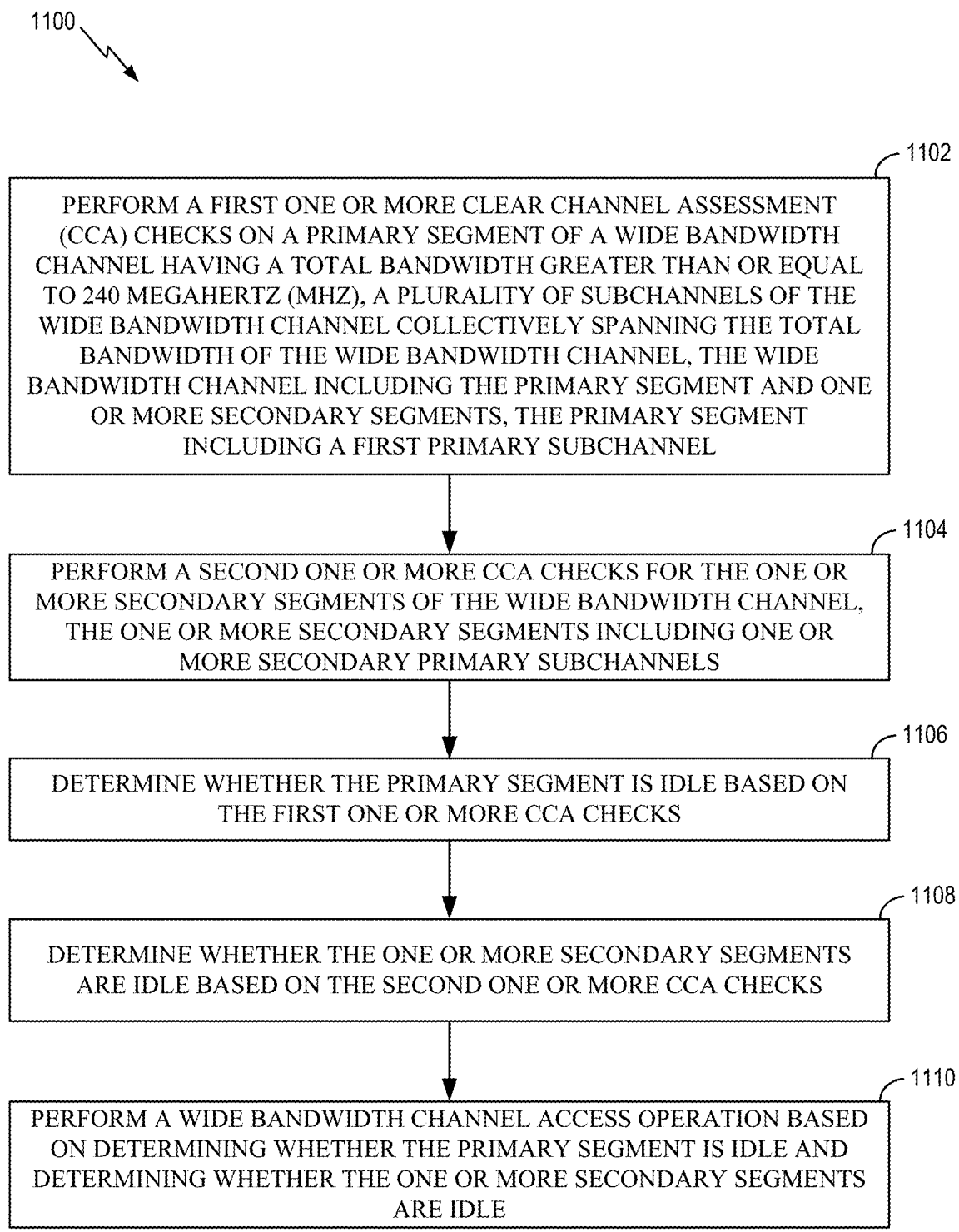
FIG. 11 shows a flowchart illustrating an example process that supports CCA for wide bandwidth channels, in accordance with some examples.

FIG. 11 shows a flowchart illustrating an example process 1100 that supports CCA for wide bandwidth channels according to some aspects. The operations of the process 1100 may be implemented by an AP or its components as described herein. For example, the process 1100 may be performed by a wireless communication device such as the wireless communication device 400 described above with reference to FIG. 4. In some aspects, the process 1100 may be performed by an AP or a STA, such as one of the APs 102 and 502 described above with reference to FIGS. 1 and 5A, respectively or a STA such as STA 104 or 504 described above with reference to FIGS. 1 and 5B respectively.

In some aspects, in block 1102, the wireless communication device performs a first one or more CCA checks on a primary segment of a wide bandwidth channel having a total bandwidth greater than or equal to 240 megahertz (MHz). In some aspects, each CCA check of the first one or more CCA checks is performed serially. The wide bandwidth channel includes a plurality of subchannels of the wide bandwidth channel collectively spanning the total bandwidth of the wide bandwidth channel. The wide bandwidth channel also includes the primary segment and one or more secondary segments. The primary segment of the wide bandwidth channel includes a first primary subchannel. In some aspects, the CCA checks can be performed by a PHY of a device as described herein. The one or more CCA checks can include full CCA checks, or a mixture of different types of CCA checks including PIFS, SIFS, or other checks. Additional aspects of such CCA checks are described below.

In some aspects, in block 1104, the wireless communication device performs a respective second CCA checks for the one or more secondary segments of the wide bandwidth channel. The one or more secondary segments include one or more secondary primary subchannels. As described above, in some aspects the respective second CCA checks can be full CCA checks or include different types of CCA checks.

In some aspects, the first one or more CCA checks includes a full CCA check for the first primary subchannel and a point coordination function (PCF) interframe space (PIFS) check for one or more secondary subchannels of the plurality of subchannels of each segment in the wide bandwidth channel.

In some aspects, the total bandwidth of the wide bandwidth channel is 320 MHz. In some such aspects, the primary segment has a primary segment bandwidth of 160 MHz, the one or more secondary segments include a secondary segment with a secondary segment bandwidth of 160 MHz, and each of the plurality of subchannels has a corresponding subchannel bandwidth of 20 MHz.

In some aspects, a first CCA check of the first one or more CCA checks for the total bandwidth of 320 MHz has a first CCA threshold of negative 70 decibel-milliwatts (dBm). In some such aspects a second CCA check of the respective second CCA checks for the secondary segment bandwidth of 160 MHz has a second CCA threshold of negative 73 dBm. Some such aspects further include performing a third CCA check for the first primary subchannel, the third CCA check having a third CCA threshold of negative 62 dBm.

In some aspects, the total bandwidth of the wide bandwidth channel is 240 MHz. In some such aspects, the primary segment has a primary segment bandwidth of 160 MHz, the one or more secondary segments include a secondary segment with a secondary segment bandwidth of 80 MHz, and each of the plurality of subchannels has a corresponding subchannel bandwidth of 20 MHz. In some aspects, a first CCA check of the first one or more CCA checks for the total bandwidth of 240 MHz has a first CCA threshold of negative 71 dBm. In some aspects, a second CCA check of the respective second CCA checks for the secondary segment bandwidth of 80 MHz has a second CCA threshold of negative 76 dBm. In some aspects, the process 1100 can further include a third CCA check for the first primary subchannel. The third CCA check can have a third CCA threshold of negative 62 dBm.

In some aspects, the first one or more CCA checks includes CCA checks for each 20 MHz bandwidth of the primary segment. In some aspects, the first one or more CCA checks includes CCA checks for each subchannel of the primary segment, CCA checks for each 40 MHz bandwidth of the primary segment, CCA checks for each 80 MHz bandwidth of the primary segment, and a 160 MHz CCA check for the primary segment. In some such aspects, the respective second CCA checks includes CCA checks for each subchannel of the one or more secondary segments, CCA checks for each 40 MHz bandwidth of the one or more secondary segments, and a full bandwidth CCA check for each secondary segment of the one or more secondary segments.

In some aspects, in block 1106, the wireless communication device determines whether the primary segment is idle based on the first one or more CCA checks. In some aspects, the determination can be based on processing multiple CCA check values. In some aspects, the determination is based on whether all CCA checks for the associated segment are identified as idle by the CCA checks for the segment. In some aspects, a single busy value from multiple CCA checks can result in the segment being busy, in the absence of additional puncturing configurations for a segment.

In some aspects, in block 1108, the wireless communication device determines whether the one or more secondary segments are idle based on the respective second CCA checks. Just as above, the particular CCA configuration will determine how the CCA measurements are used with associated CCA thresholds and serial or parallel CCA checks. Additional details and example determinations are provided below, for example, with respect to FIGS. 15 and 16.

In some aspects, in block 1110, the wireless communication device performs a wide bandwidth channel access operation based on determining whether the primary segment is idle and determining whether the one or more secondary segments are idle. Such a wide bandwidth channel access operation can either be a contention operation, such as a random backoff timer, prior to performing additional CCA checks. Such a wide bandwidth channel access operation can also be a transmission using some or all of a wide bandwidth channel, based on the determinations and the associated CCA checks. Additional details and examples of wide bandwidth channel access operations are provided below.

In some aspects, the primary segment has a bandwidth of 160 MHz and includes a plurality of secondary subchannels. In some examples, the one or more secondary segments have a collective bandwidth of 80 MHz. In some examples, the one or more secondary segments have a collective bandwidth of 160 MHz.

In some aspects, additional blocks can include generating one or more CCA indication reports based on at least one of the first one or more CCA checks and the respective second CCA checks. The one or more CCA indication reports include an indication of a status of the first primary subchannel of the primary segment and at least one secondary primary subchannel of the one or more secondary primary subchannels. In some such aspects, performing the wide bandwidth channel access operation of block 1110 is based on the one or more CCA indication reports. In some examples, the one or more CCA indication reports include a first CCA report for the primary segment and at least a second CCA report for the one or more secondary segments.

In some aspects, the wide bandwidth channel access operation includes transmitting data using the wide bandwidth channel based on the first CCA report and the second CCA report. In some aspects, the wide bandwidth channel access operation includes transmitting data using the wide bandwidth channel based on at least one of a determination that the primary segment is idle and a determination that the one or more secondary segments are idle. In some aspects, the wide bandwidth channel access operation includes refraining from transmitting data (e.g., idling transmission, halting transmission, or shifting data to a different channel) on the wide bandwidth channel during a backoff period in response to a determination that the primary segment is busy and a determination that the one or more secondary segments are busy.

In some aspects, the backoff period of the wide bandwidth channel access operation includes a joint backoff period shared by the plurality of subchannels. In some such aspects, the joint backoff period of the wide bandwidth channel access operation of block 1110 includes a random backoff time and an interframe spacing time. In some such operations, the backoff period includes a first backoff period for the first primary subchannel and the one or more secondary primary subchannels, and at least one second backoff period for a plurality of secondary subchannels of the plurality of subchannels, the at least one second backoff period being different from the first backoff period.

In some aspects, the wide bandwidth channel access operation includes transmitting data on at least one of the one or more secondary segments of the wide bandwidth channel and refraining from transmitting data on the primary segment based on a determination that the primary segment is busy and a determination that the at least one of the one or more secondary segments is idle.

In some aspects, the wide bandwidth channel access operation includes transmitting data on a puncture set of the primary segment and the one or more secondary segments in accordance with a preamble puncturing pattern matching corresponding idle values from the first one or more CCA checks and the respective second CCA checks. In some such aspects, the wide bandwidth channel access operation of block 1110 further includes communicating on a first portion of the plurality of subchannels and a second portion of the plurality of subchannels based on a resource unit allocation for the primary segment and the one or more secondary segments of the wide bandwidth channel.

In some aspects, the use of secondary segments with an associated secondary primary subchannel allows a wide bandwidth channel to repeat legacy CCA patterns. The use of legacy patterns can allow CCA for a wide bandwidth channel that reuses existing signaling and schemes, including CCA indications, preamble puncturing patterns, and RU allocation tables. The can also reuse existing CCA report formats by sending multiple CCA reports for different segments of a wide bandwidth channel that have primary subchannels, while improving spectral efficiency over simply using multiple legacy channels that have the same total bandwidth as a wide bandwidth channel.

In some aspects, the first one or more CCA checks includes a first CCA check for the first primary subchannel, a third plurality of CCA checks for secondary subchannels of the primary segment, one or more second CCA checks for each secondary primary subchannel of the one or more secondary segments, and a fourth plurality of CCA checks for secondary subchannels of the one or more secondary segments. In some such aspects, the third plurality of CCA checks are performed in parallel after the first CCA check identifies an idle value for the first primary subchannel.

In some aspects, the first one or more CCA checks includes a first plurality of CCA checks and the respective second CCA checks includes a second plurality of CCA checks. In some aspects, the first plurality of CCA checks includes a primary channel CCA check that generates an indication of an idle value for the first primary subchannel, and the second plurality of CCA checks includes at least one secondary primary channel CCA check that generates at least one indication of an idle value for the one or more secondary primary subchannels.

Figure 12A:
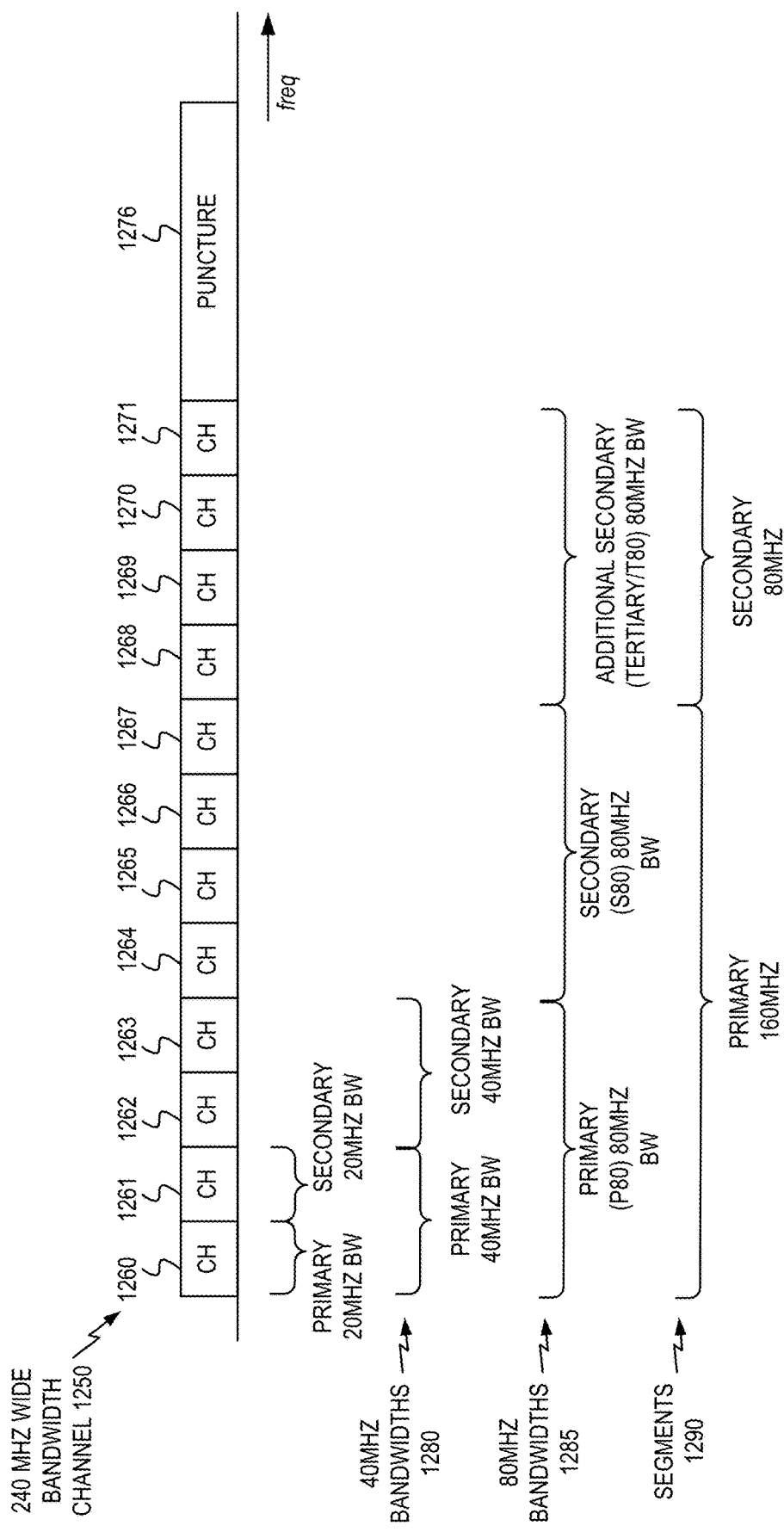
FIG. 12A illustrates aspects of a wide bandwidth channel with CCA configured for wide bandwidth channels, in accordance with some examples.

FIG. 12A illustrates aspects of a wide bandwidth channel 1250 with CCA configured for wide bandwidth channels in accordance with some examples. Wide bandwidth channel 1250 is illustrated in FIGS. 6, 9, and 10 as a wide bandwidth channel with a total bandwidth of 320 MHz. 240 MHz wide bandwidth channel 1250 is an example of a wide bandwidth channel with a different total bandwidth. With the given bandwidth configurations, the largest equal divisions of the 240 MHz bandwidth is three 80 MHz bandwidths, which can be defined as a primary 80 MHz bandwidth (P80), a second 80 MHz bandwidth (S80) and a third 80 MHz bandwidth (T80).

240 MHz wide bandwidth channel includes 12 subchannels 1260, 1261, 1262, 1263, 1264, 1265, 1266, 1267, 1268, 1269, 1270, and 1271 each having a 20 MHz bandwidth. Different configurations for CCA can then perform checks on different bandwidths, including 40 MHz bandwidths 1280, 80 MHz bandwidths 1285, or other such bandwidths in different configurations. As described above, different configurations can also operate with segments such as segments 1290 and 1291, or other configurations to perform CCA checks for the total bandwidth of such a wide bandwidth channel. The described configurations can, in some aspects, include CCA checks for a primary 80 Mhz bandwidth and a secondary 160 MHz bandwidth, a primary 80 MHz bandwidth ant two secondary 80 MHz bandwidths, a primary 160 MHz bandwidth and a secondary 80 MHz bandwidth, or any other such configuration. In some aspects, a 240 MHz wide bandwidth channel can be implemented in the same frequency range as a 320 MHz wide bandwidth channel, but with a puncture bandwidth 1276 as illustrated in FIG. 12. In such an aspect, four subchannels 622, 623, 624, and 625 of 320 MHz wide bandwidth channel 600 are replaced with puncture bandwidth 1276 to create the 240 MHz wide bandwidth channel 1250. In other aspects, a 240 MHz wide bandwidth channel can be implemented without such a puncture bandwidth 1276. In any example described herein CCA operations and patterns of CCA checks described for a 320 MHz wide bandwidth channel can be applied to a 240 MHz wide bandwidth channel by adjusting the CCA checks at some bandwidths to match the configuration of the particular channel. The CCA checks can be done not only for 240 MHz wide bandwidth channels, but for any other wide bandwidth channel with different total bandwidths. For example, is a CCA process with serial CCA checks for a primary subchannel followed by subsequent secondary bandwidths at each level to cover an entire 320 MHz wide bandwidth channel, the same structure of operations can be performed with CCA checks duplicated at some bandwidths based on the particular channel configuration. For example, in a 240 MHz wide bandwidth channel 1250 with a single primary subchannel, the final two CCA checks can be for the two secondary 80 MHz bandwidths. Similarly, in a 240 MHz wide bandwidth channel with segments 1290, independent CCA operations can be performed for a primary 160 MHz segment and a secondary 80 MHz segment, similar to the CCA check operations described for FIG. 9 above. Corresponding CCA checks can be performed in a 240 MHz wide bandwidth channel configured with 3 80 MHz segments and 3 associated primary subchannels. Any CCA operations described herein can be applied in this fashion to a wide bandwidth channel with a given total bandwidth. Similarly, while examples described herein are discussed with smallest subchannels of 20 MHz, configurations with different subchannel bandwidths, such as 10 MHz or 40 MHz, are possible.

Figure 12B:
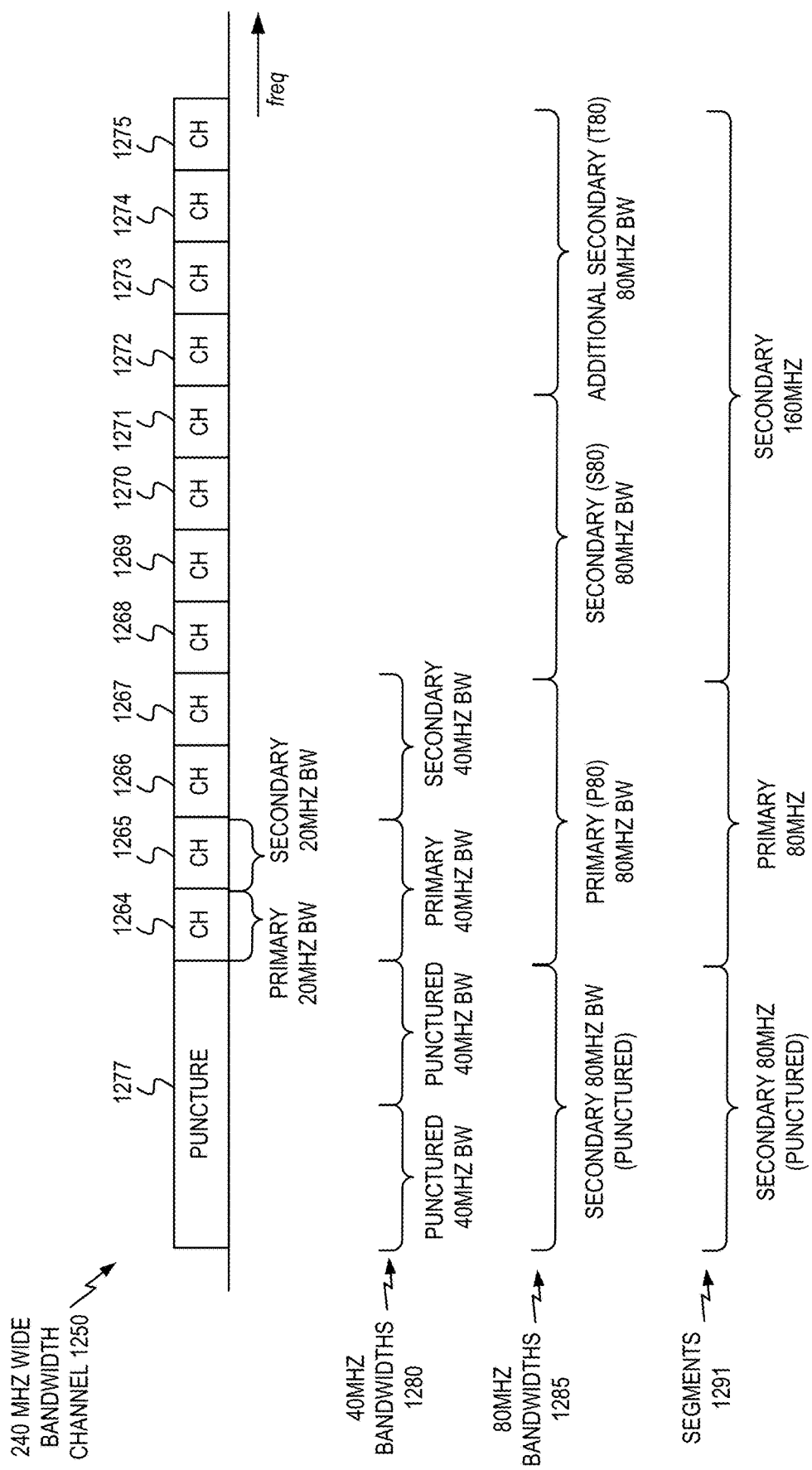
FIG. 12B illustrates aspects of a wide bandwidth channel with CCA configured for wide bandwidth channels, in accordance with some examples.

FIG. 12B illustrates aspects of the wide bandwidth channel 1250 with CCA configured for wide bandwidth channels, in accordance with some examples. The configuration of channel 1250 in FIG. 12B is set for a 240 MHz wide bandwidth channel with a puncture bandwidth 1277 at the lower end of the frequency range. Compared with the configuration in FIG. 12A, where the higher frequencies have puncture bandwidth 1276, in FIG. 12B, puncture bandwidth 1277 replaces subchannels 1260, 1261, and 1262, and channels 1272, 1273, 1274, and 1275 are present rather than puncture bandwidth 1276. The described configuration results in the primary segment of segments 1291 having an 80 MHz bandwidth. Also, the 240 MHz wide bandwidth channel 1250 as configured in FIG. 12B not having a 160 MHz primary bandwidth, as an 80 Mhz portion of what would have been the 160 MHz primary bandwidth is subject to puncture bandwidth 1277. Segments 1291 as shown include an 80 MHz primary segment and a 160 MHz secondary segment.

With the given puncture bandwidth 1277, the P80 bandwidth is made up of subchannels 1264, 1265, 1266, and 1267, the S80 bandwidth is made up of subchannels 1268, 1269, 1270, and 1271, and the T80 bandwidth is made up of channels 1272, 1273, 1274, and 1275. Different configurations can structure the 240 MHz bandwidths for CCA checks based on 160 MHz and 80 MHz combinations, 80 MHz bandwidth combinations, or any other such CCA check configuration described herein as applied to a total bandwidth of 240 MHz.

Figure 13:
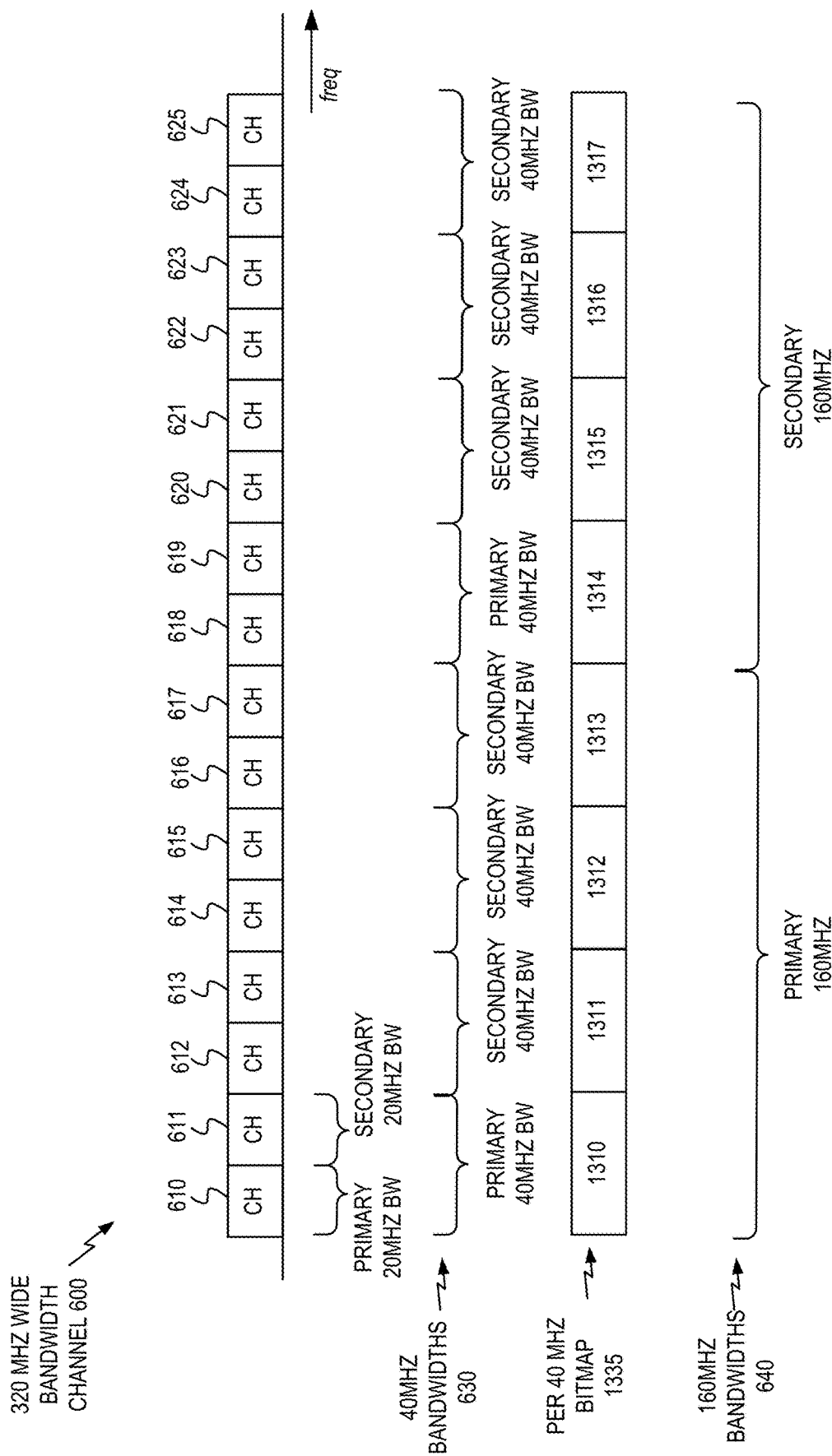
FIG. 13 illustrates aspects of a wide bandwidth channel with CCA configured for wide bandwidth channels, in accordance with some examples.

FIG. 13 illustrates aspects of a wide bandwidth channel with CCA configured for wide bandwidth channels in accordance with some examples. As described above, some aspects can configure CCA with CCA checks to generate bitmaps for an entire range of a wide bandwidth channel rather than a tiered set of CCA checks at increasing secondary bandwidths. FIG. 13 illustrates 320 MHz wide bandwidth channel 600, showing a per 40 MHz bitmap 1335 that can be generated by CCA checks in some aspects. Bitmap 1335 includes values 1310, 1311, 1312, 1313, 1314, 1315, 1316, and 1317. In some aspects, each value can be a 1 or a 0 indicating an idle status or a busy status for an associated bandwidth. Bitmaps for particular bandwidths can pass information for complex puncture patterns to increase spectral efficiency and increase channel usage, at a cost of additional CCA checks and signaling overhead. While performing CCA checks at a lowest bandwidth of a configuration allows the greatest channel usage, per 20 MHz information as the total bandwidth of a wide bandwidth channel such as channel 600 is at 320 MHz can create excessive overhead. Some aspects can use puncturing at a higher bandwidth range, such as 40 MHz or 80 MHz. In such aspects, constraining CCA checks to be performed on some bandwidth or greater can increase the efficiency of resource use. The constraints can be created, for example, by reducing the number of CCA checks while generating a bitmap or partial bitmap of idle and busy values for a wide bandwidth channel.

Additional examples described herein can be used for different bitmaps. In some aspects a wireless communication device can perform CCA checks at each 20 MHz bandwidth of a wide bandwidth channel, with a full CCA check on the primary subchannel, and a shortened check, such as a PIFS or SIFS on the secondary channels. Various puncture patterns can then be defined and used to transmit on a portion of a wide bandwidth channel having a total bandwidth greater than or equal to 240 MHz, with some of the puncture patterns spanning more than 160 MHz of the wide bandwidth channel. Other such aspects can have similar configurations on a per 40 MHz basis as described above for FIG. 13, a per 80 MHz basis, or any other similar set of CCA checks to generate a bitmap for CCA of a wide bandwidth channel.

While FIG. 13 shows configured bandwidths for each 40 MHz bandwidth of an entire wide bandwidth channel to allow some CCA configurations to focus on a 40 MHz CCA check at every 40 MHz bandwidth to flexibly provide support for 40 MHz based puncture patterns, other aspects can define a combinations of such checks at different bandwidths for a single wide bandwidth channel. In some aspects, a per 20 MHz check can be configured on a primary 160 MHz bandwidth, with a per 40 MHz CCA check configured for bandwidths outside the primary 160 MHz bandwidth. Such a configuration can use legacy CCA check operations to generate a power 20 MHz bitmap for a primary 160 MHz bandwidth as described above, and can then generate a separate per 40 MHz bitmap using 40 MHz CCA checks for bandwidths outside the primary 160 MHz bandwidth. Other similar CCA configurations can include different combinations of CCA checks for different parts of a wide bandwidth channel, including creation of multiple bitmaps at different frequencies, as well as generation one or more CCA indication reports to support the different CCA check configurations.

Figure 14:
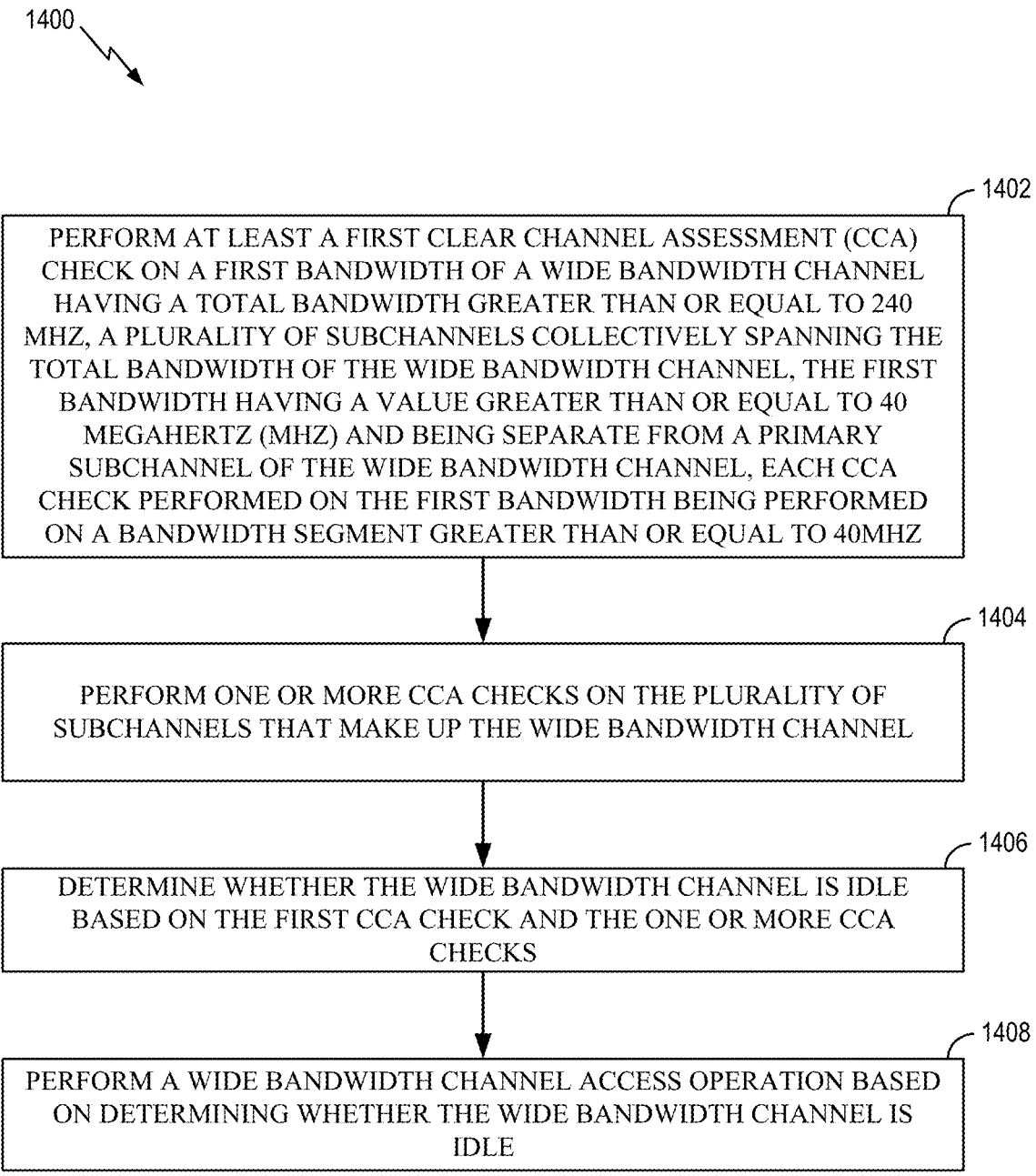
FIG. 14 shows a flowchart illustrating an example process that supports CCA for wide bandwidth channels, in accordance with some examples.

FIG. 14 shows a flowchart illustrating an example process 1400 that supports CCA for wide bandwidth channels according to some aspects. The operations of the process 1400 may be implemented by an AP or its components as described herein. For example, the process 1400 may be performed by a wireless communication device such as the wireless communication device 400 described above with reference to FIG. 4. In some aspects, the process 1400 may be performed by an AP or a STA, such as one of the APs 102 and 502 described above with reference to FIGS. 1 and 5A, respectively or a STA such as STA 104 or 504 described above with reference to FIGS. 1 and 5B respectively.

In some aspects, in block 1402, the wireless communication device performs at least a first clear channel assessment (CCA) check on a first bandwidth of a wide bandwidth channel having a total bandwidth greater than or equal to 240 MHz, a plurality of subchannels collectively spanning the total bandwidth of the wide bandwidth channel, the first bandwidth having a value greater than or equal to 40 megahertz (MHz) and being separate from a primary subchannel of the wide bandwidth channel, each CCA check performed on the first bandwidth being performed on a bandwidth greater than or equal to 40 MHz. In some aspects, the first CCA check is on an intermediate bandwidth, where if the entire channel is idle, a smaller bandwidth, such as a 20 MHz subchannel, can be used for transmissions. The use of CCA checks on bandwidths greater than or equal to 40 MHz can reduce overhead while supporting puncturing patterns at 40 MHz or greater bandwidths.

In some aspects, in block 1404, the wireless communication device performs one or more CCA checks on the plurality of subchannels that make up the wide bandwidth channel.

In some aspects, in block 1406, the wireless communication device determines whether the wide bandwidth channel is idle based on the first CCA check and the one or more CCA checks. Just as described above in process 1100, determination of block 1406 can used various determination operations, such as those of FIGS. 15 and 16, in different aspects.

In some aspects, in block 1408, the wireless communication device performs a wide bandwidth channel access operation based on determining whether the wide bandwidth channel is idle. The wide bandwidth channel access operation can be a contention operation if the wide bandwidth channel is busy. The wide bandwidth channel access operation can be a transmission if the wide bandwidth channel is idle. The wide bandwidth access operation can be either in some aspects with puncturing which perform subsequent contention operations for busy portions of the wide bandwidth channel while transmitting on a set of bandwidths matching a puncture pattern.

In some aspects, the wide bandwidth channel includes a primary 40 MHz bandwidth and a plurality of secondary 40 MHz bandwidths.

In some aspects, the one or more CCA checks includes a CCA check for the primary 40 MHz bandwidth and a corresponding CCA check for each of the plurality of secondary 40 MHz bandwidths.

In some aspects, the wide bandwidth channel access operation includes transmitting on a first subset of the plurality of secondary 40 MHz bandwidths in accordance with a preamble puncturing pattern matching a set of idle values from a portion of the one or more CCA checks for a first set of the plurality of secondary 40 MHz bandwidths.

In some aspects, the wide bandwidth channel access operation includes communicating on the primary subchannel and at least a first 80 MHz bandwidth in accordance with a preamble puncturing pattern matching one or more idle values generated by the one or more CCA checks.

In some aspects, the wide bandwidth channel is segmented into a primary segment and one or more secondary segments. In some aspects, the primary segment has a primary segment bandwidth of 160 MHz. In some aspects, the primary segment has a primary segment bandwidth of 80 MHz, wherein the wide bandwidth channel does not include a primary 160 MHz bandwidth, and the total bandwidth of the wide bandwidth channel is 240 MHz. In some aspects, the one or more CCA checks include a first plurality of CCA checks on each 20 MHz bandwidth of the primary segment, and wherein the first bandwidth is in the one or more secondary segments. In some aspects, the one or more CCA checks include a second plurality of CCA checks on each 40 MHz bandwidth of the one or more secondary segments other than the first bandwidth.

In some aspects, the one or more CCA checks include a first plurality of CCA checks on each 20 MHz bandwidth of the primary segment, and the first bandwidth is in the one or more secondary segments. In some such aspects, the one or more CCA checks include a second plurality of CCA checks on each 40 MHz bandwidth of the one or more secondary segments other than the first bandwidth. In some aspects, a physical (PHY) layer of the wireless communication device is constrained (e.g., limitations are set on device operation) so that the wireless communication device does not perform any CCA check any portion of the wide bandwidth channel smaller than 40 MHz. Some aspects further involve generating a per 40 MHz bitmap indicating a busy value or an idle value for each 40 MHz bandwidth of the wide bandwidth channel. Some aspects further operate where the one or more CCA checks includes a CCA check for a 40 MHz bandwidth of the wide bandwidth channel, and wherein the set of low power CCA thresholds includes a second threshold of negative 82 dBm for the 40 MHz bandwidth.

In some aspects, a PHY layer of the wireless communication device is constrained so that the wireless communication device does not perform any CCA check any portion of the wide bandwidth channel smaller than 40 MHz. Some such aspects further involve generating a per 40 MHz bitmap indicating a busy value or an idle value for each 40 MHz bandwidth of the wide bandwidth channel.

In some aspects, one or more CCA checks includes a CCA check for a 40 MHz bandwidth of the wide bandwidth channel, and wherein the set of low power CCA thresholds includes a second threshold of negative 82 dBm for the 40 MHz bandwidth.

In some aspects, a second CCA check for a secondary subchannel different from the first bandwidth has an energy detection threshold of negative 62 dBm when a wireless preamble is not detected, and the secondary subchannel has a 20 MHz bandwidth.

In some aspects, a second CCA check for the first bandwidth has an energy detection threshold of negative 59 dBm when a wireless preamble is not detected.

In some aspects, a second CCA check for a secondary 160 MHz bandwidth of the wide bandwidth channel has an energy detection threshold of negative 53 dBm when a wireless preamble is not detected.

In some aspects, a physical (PHY) layer of the wireless communication device is constrained so that the wireless communication device does not perform any CCA check any portion of the wide bandwidth channel smaller than 40 MHz.

Figure 15:
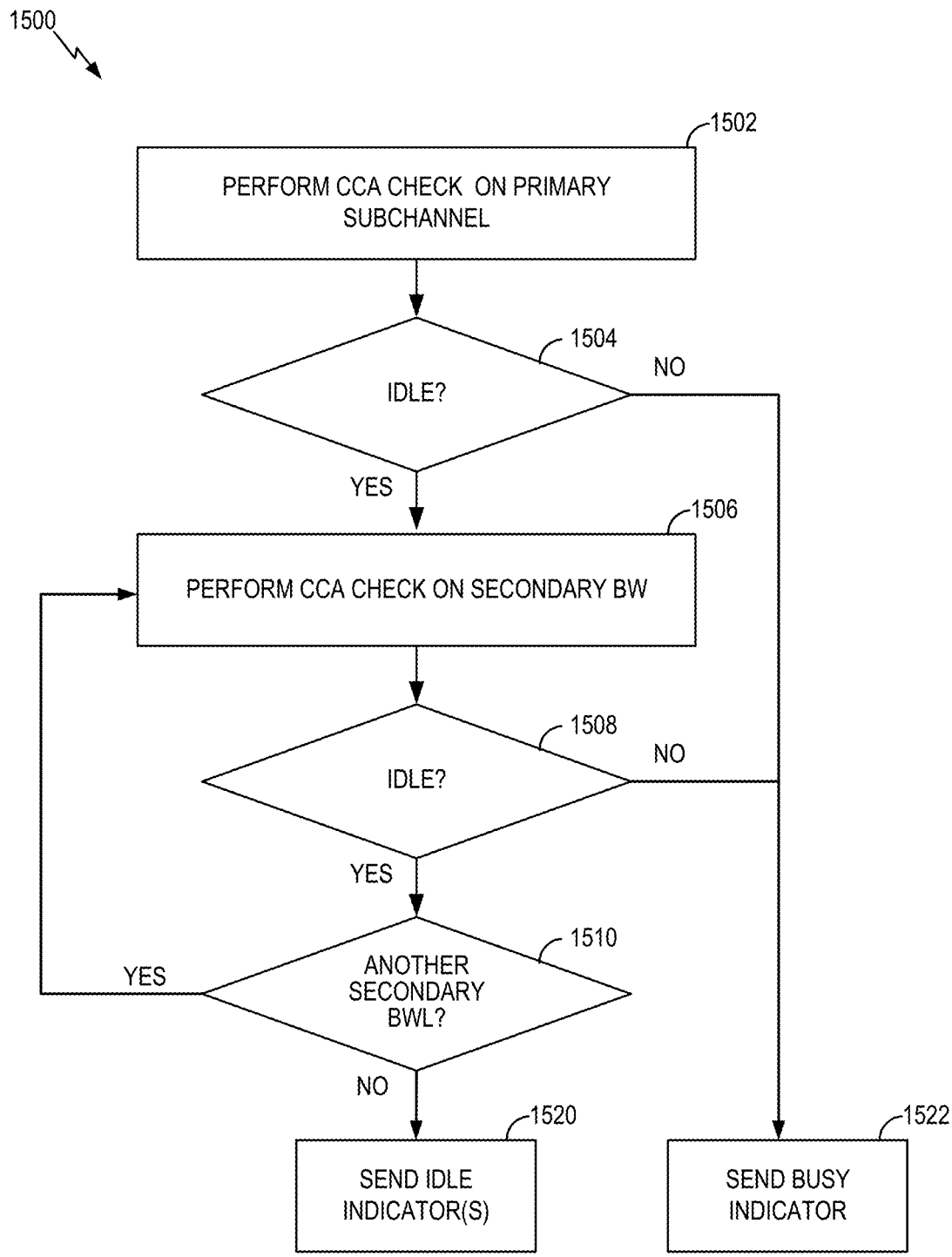
FIG. 15 shows a flowchart illustrating an example process that supports CCA for wide bandwidth channels, in accordance with some examples.

FIG. 15 shows a flowchart illustrating an example process 1500 that supports CCA for a wide bandwidth channel according to some aspects. The process 1500 may be performed by a wireless communication device such as the wireless communication device 400 described above with reference to FIG. 4. In some aspects, the process 1500 may be performed by a wireless communication device operating as or within an AP or STA, such a STA 104, AP 102, AP 502, STA 504, or network interface 705 described above. For example, the process 1500 may be an example aspect of the process for performing a CCA check with respect to the wide bandwidth channel 600 as configured in FIG. 6. In some aspects, process 1500 can be performed multiple times for a single wide bandwidth channel. For example, a wide bandwidth channel configured with multiple primary subchannels can perform process 1500 for each segment having a separate primary subchannel. The configuration illustrated in FIG. 10, for example, can perform process 1500 three times, once for each segment having a separate primary subchannel. In various aspects, these multiple iterations of process 1500 can be performed in serial or in parallel, or a combination of serial and parallel operations in an interleaved fashion.

In some aspects, in block 1502 the wireless communication device performs a CCA check of a primary subchannel of the wide bandwidth channel. For example, the primary subchannel may be a first 20 MHz primary subchannel. During the CCA check of the primary 20 MHz bandwidth subchannel, the PHY layer may compare a detection metric (such as energy) with a detection threshold (such as a signal detection threshold or a packet detection threshold) to determine if the subchannel is idle or is busy. Examples of the thresholds used for different primary subchannel bandwidths are provided in the tables above.

In some aspects, in block 1504 the wireless communication device determines whether the primary subchannel is idle. If the primary subchannel is not idle (meaning a signal or a packet has been detected during the CCA check in block 1502), then the process 1500 proceeds to block 1522, in which the PHY layer sends a CCA indication (with a busy indicator for the primary subchannel) to the MAC layer. Otherwise, if the primary subchannel is idle (meaning no signal or packet has been detected during the CCA check in block 1502), then the process 1500 proceeds to block 1506.

In some aspects, in block 1506 the wireless communication device performs a CCA check on a secondary bandwidth (beginning with the smallest secondary bandwidth, for example, a secondary 20 MHz bandwidth, in a breakdown for the wide bandwidth channel). During the CCA check of the secondary 20 MHz bandwidth, the PHY layer may compare a detection metric (such as energy) for the secondary bandwidth with a detection threshold (such as a signal detection threshold or a packet detection threshold) to determine if the bandwidth is idle or is busy. Examples of the thresholds used for different secondary bandwidths are provided in the tables above.

In some aspects, in block 1508 the wireless communication device determines whether the secondary bandwidth is idle. If the secondary bandwidth is not idle (meaning a signal or a packet has been detected during the CCA check in block 1506), then the process 1500 proceeds to block 1522. In block 1522, the PHY layer may send a CCA indication (with a busy indicator for the secondary bandwidth) to the MAC layer. Otherwise, if the secondary bandwidth is idle (meaning no signal or packet has been detected during the CCA check in block 1506), then the process 1500 proceeds to block 1510.

In some aspects, in block 1510 the wireless communication device determines whether there is another secondary bandwidth defined for the wide bandwidth channel. If so, the process 1500 proceeds back to block 1506 to perform one or more additional CCA checks on larger secondary bandwidths defined for the wide bandwidth channel. For example, a next largest secondary bandwidth may be a secondary 40 MHz bandwidth—twice the size of the smallest secondary bandwidth. Continuing the pattern, the next largest secondary bandwidth (after the 40 MHz bandwidth) may be a secondary 80 MHz bandwidth, and so on. In some aspects, the largest secondary bandwidth may be a secondary 160 MHz bandwidth. If no other secondary channels are defined, the process 1500 proceeds to block 1520. In block 1520, the PHY layer may send an idle indicator to the MAC layer to indicate that the wide bandwidth channel is clear for use by the transmitter.

Figure 16:
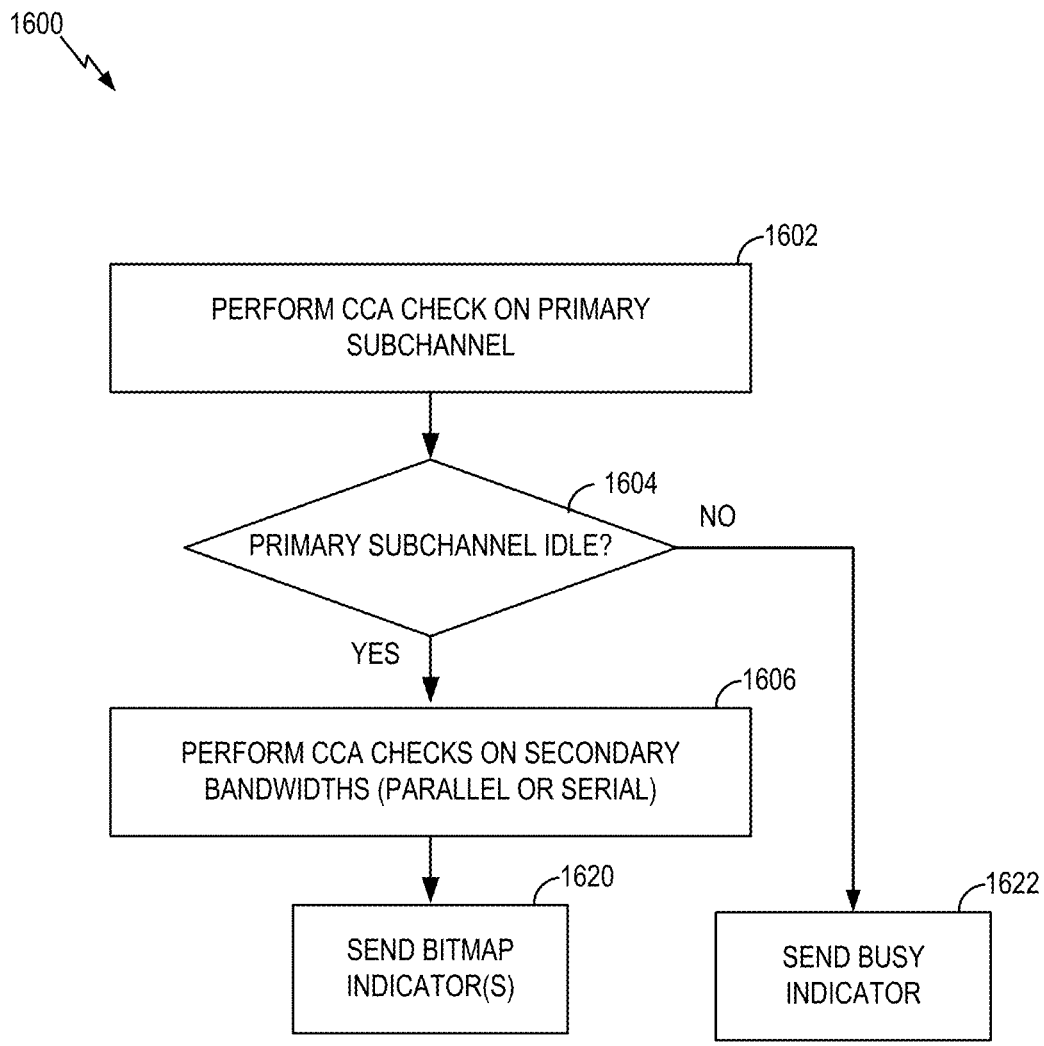
FIG. 16 shows a flowchart illustrating an example process that supports CCA for wide bandwidth channels, in accordance with some examples.

FIG. 16 shows a flowchart illustrating an example process 1600 that supports CCA for a wide bandwidth channel according to some aspects. Just as above for process 1500, the process 1600 may be performed by a wireless communication device such as the wireless communication device 400 described above with reference to FIG. 4. In some aspects, the process 1600 may be performed by a wireless communication device operating as or within an AP or STA, such a STA 104, AP 102, AP 502, STA 504, or network interface 705 described above. For example, the process 1600 may be an example aspect of the process for performing a CCA check with respect to the wide bandwidth channel 600 as configured in FIG. 13.

In some aspects, in block 1602 the wireless communication device performs a CCA check of a primary subchannel of the wide bandwidth channel. As described above, if multiple primary subchannels are present, the system can be configured to perform CCA checks for the different primary subchannels in serial or in parallel, because a busy result from one primary subchannel will not preclude performing a CCA check on another primary subchannel of a wide bandwidth channel in some aspects. During the CCA check of the primary 20 MHz bandwidth subchannel, a wireless communication device can may compare an energy or preamble detection value measured as part of the CCA check with a detection threshold to determine if the subchannel is idle or is busy. Examples of the thresholds used for different primary subchannel bandwidths are provided in the tables above.

In some aspects, in block 1604 the wireless communication device determines whether the primary subchannel is idle. If the primary subchannel is not idle (meaning a signal or a packet has been detected during the CCA check in block 1602), then the process 1600 proceeds to block 1622, in which the wireless communication device generates an indication that the segment associated with the primary subchannel is busy. Otherwise, if the primary subchannel is idle (meaning no signal or packet has been detected during the CCA check in block 1602 or the detection is below a CCA threshold), then the process 1600 proceeds to block 1606.

In some aspects, in block 1606 the wireless communication device performs a CCA check on a plurality of secondary bandwidths. These CCA checks can, for example, use the set of CCA thresholds from table 2 above. These secondary bandwidth checks of block 1606 can be performed in serial or in parallel, as the performance of a subsequent CCA check is not necessarily dependent on the result of a previous CCA check. By way of contrast, in the example of FIG. 15, any busy result generates a busy indicator. Process 1600 instead generates a bitmap of the results from block 1606. The CCA check operation in block 1606 can be different than the CCA check operation of block 1602. While the CCA check operation of block 1602 can be a full CCA check associated with a large random backoff time following a busy result, the CCA checks on the secondary bandwidths can be CCA checks with a shorter backoff time following a busy result. For example, in some aspects, the CCA checks of block 1606 can be based on a point coordination function (PCF) interframe space (PIFS), a short interframe space (SIFS), or another such CCA check other than a full check. Such a PIFS check or other CCA checks can allow a shorter delay before a device performs a subsequent check on the bandwidth, and allows a device occupying part of a wide bandwidth channel to occupy more of the channel over time if parts of the wide bandwidth channel are subject to a puncture.

In some aspects, rather than automatically performing a CCA check on every secondary bandwidth, the CCA checks of operation of block 1602 can be compared with available puncture patterns. In some such aspects, a given secondary bandwidth will have a CCA check performed as long as it can be part of a puncture pattern that includes other secondary bandwidths that have not yet returned a busy value. In such aspects, if a secondary bandwidth has not been subject to a CCA check, but no remaining puncture patterns that include the particular secondary bandwidth are possible in view of prior CCA checks, then block 1606 can return a busy indication. In some aspects, a bitmap indicator showing the results of all CCA checks as part of process 1600 is generated and sent in block 1620 as part of a CCA indication report. In some aspects, such a bitmap is generated regardless of whether the device is able to transmit. In other aspects, if no puncture pattern is available to transmit due to no set of idle values matching available puncture patterns, then block 1606 can cause an indication that the wide bandwidth channel or a portion of the wide bandwidth channel associated with the primary subchannel from block 1602, is busy.

FIG. 16 above is described in a context of an initial CCA check on a primary subchannel. In some aspects, the initial check can be performed on a primary bandwidth greater than the bandwidth of the primary subchannel. In some aspects, for example, a full CCA check is performed on a primary 40 MHz bandwidth. If the primary 40 MHz bandwidth is idle, then serial or parallel checks are performed on secondary 40 MHz bandwidths of the wide bandwidth channel. The serial or parallel checks can be used to generate a per 40 MHz bitmap, which can reduce the complexity of CCA in some aspects.

The examples above can be used for devices operating in different modes with different thresholds. Tables 1 and 2, for example, can be applied as a first set of CCA thresholds for a wireless communication device in a first operating mode. A device can, in some aspects, operate in a second mode different from the first mode, such as a low power indoor (LPI) mode. In some such aspects, as part of low power operations, a wireless communication device can operate in a duplicate (DUP) mode that reduces the spectral efficiency while also reducing transmission power. Such low transmission power modes can be used to meet power spectral density (PSD) limits applied to some frequency bands. A dual carrier mode (DCM) can also reduce transmission power. In some aspects, DUP and DCM can be used together to enable communications in a low power configuration. In some such aspects, an AP may be configured to operate below a total power threshold, such as 5 dBm/MHz, and a non-AP STA may be configured to operate at a power below −1 dBm/MHz. The use of DUP and DCM modes for low power transmission can decrease power use in some such operating environments. Table 3 illustrates an example set of CCA thresholds that can be used in one such aspect for low power environments.

TABLE 3

| Low Power Bandwidths | CCA threshold |
| --- | --- |
| Any signal in primary 20 Mhz | −62 dBm |
| Detection of the start of WLAN signal in primary 20 Mhz BW | −82 dBm |
| Detection of the start of WLAN signal in primary 40 MHz BW | −82 dBm |
| Detection of the start of WLAN signal in primary 80 MHz BW | −82 dBm |
| Detection of the start of WLAN signal in primary 160 MHz BW | −79 dBm |
| Detection of the start of WLAN signal in 320 MHz, or 160 + 160 MHz BW | −76 dBm |

Figure 17:
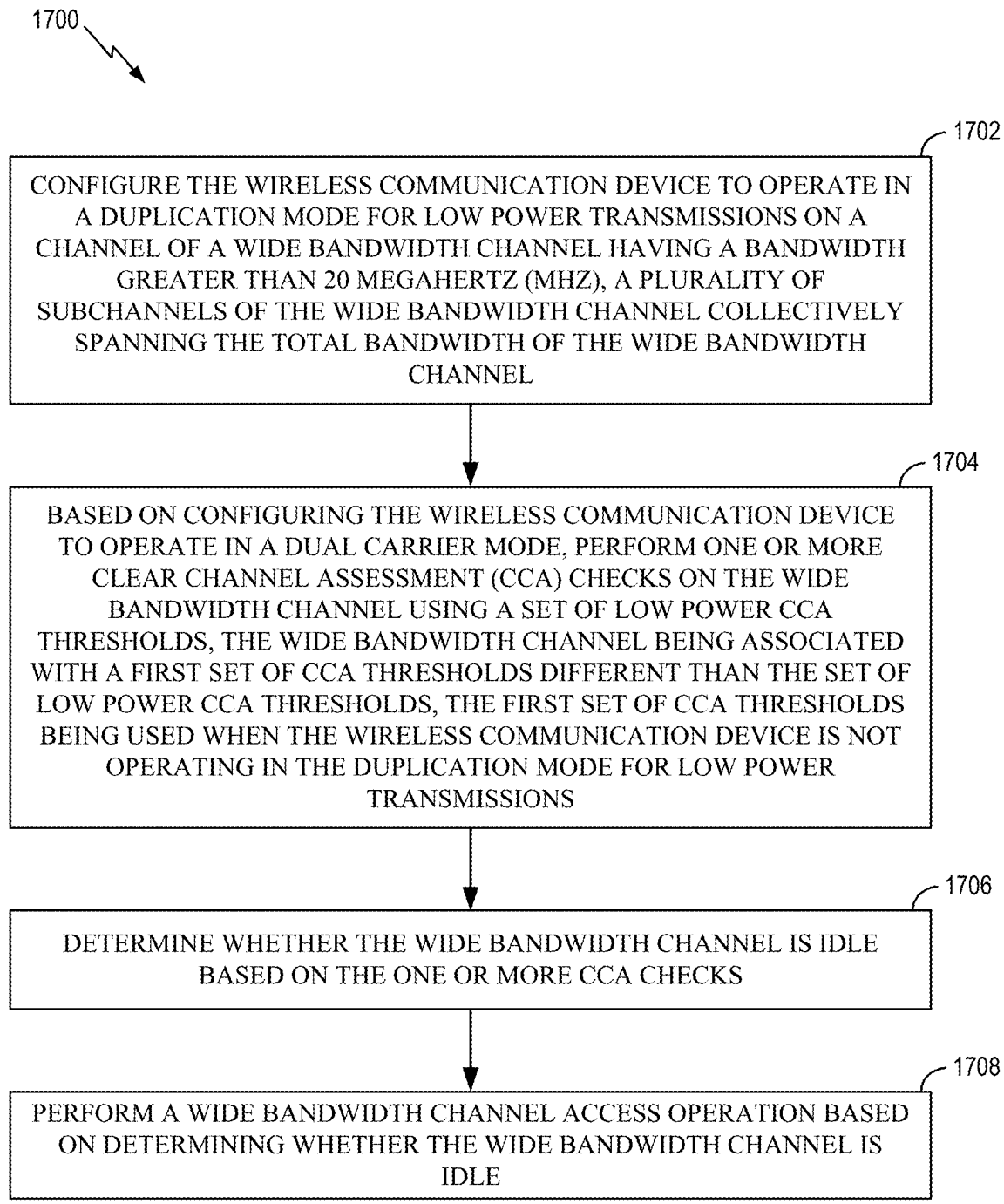
FIG. 17 shows a flowchart illustrating an example process 1700 that supports CCA for wide bandwidth channels operating with low power transmission levels, in accordance with some examples.

FIG. 17 shows a flowchart illustrating an example process 1700 that supports CCA for wide bandwidth channels operating with low power transmission levels according to some aspects. The operations of the process 1700 may be implemented by an AP or its components as described herein. For example, the process 1400 may be performed by a wireless communication device such as the wireless communication device 400 described above with reference to FIG. 4. In some aspects, the process 1700 may be performed by an AP or a STA, such as one of the APs 102 and 502 described above with reference to FIGS. 1 and 5A, respectively or a STA such as STA 104 or 504 described above with reference to FIGS. 1 and 5B respectively.

In some aspects, in block 1702, the wireless communication device is configured to operate in a duplication mode for low power transmissions on a wide bandwidth channel. The duplication mode involves at least a portion of the wide bandwidth channel having a bandwidth greater 20 megahertz (MHz). A plurality of subchannels of the wide bandwidth channel collectively spanning the total bandwidth of the wide bandwidth channel. As described herein, configurations can, in different aspects, include dual carrier mode configurations, or other configurations for low power transmission. Such modes can, in some aspects, be combined with the duplication mode.

In some aspects, in block 1704, the wireless communication device performs one or more clear channel assessment (CCA) checks on the wide bandwidth channel based on configuring the wireless communication device to operate in a dual carrier mode and using a set of low power CCA thresholds, the wide bandwidth channel being associated with a first set of CCA thresholds different than the set of low power CCA thresholds, the first set of CCA thresholds being used when the wireless communication device is not operating in the duplication mode for low power transmissions. In different aspects, the CCA checks can be performed in accordance with any CCA configuration described herein for a wide bandwidth channel, while also implementing low power transmissions if some or all of the wide bandwidth channel is idle and available to be used by the wireless communication device.

In some aspects, in block 1706, the wireless communication device determines whether the wide bandwidth channel is idle based on the one or more CCA checks. In some aspects, the determination is performed as described in FIG. 15, FIG. 16, or as in other descriptions of idle or busy status determinations described herein.

In some aspects, in block 1708, the wireless communication device performs a wide bandwidth channel access operation based on determining whether the wide bandwidth channel is idle. Just as described above, the wide bandwidth channel access operation will depend on the results of the determination of whether the wide bandwidth channel is idle. If some or all of the wide bandwidth channel is idle, the wide bandwidth channel access operation can be a transmission. If some or all of the wide bandwidth channel is busy, the wide bandwidth channel access can include further CCA operations such as a timer prior to performing additional CCA checks in a subsequent set of operations to determine if the formerly busy portions of the wide bandwidth channel have become idle and available for use.

In some aspects, the wireless communication device is further configured for a dual carrier mode in addition to the duplication mode for the low power transmissions.

In some aspects, the one or more CCA checks includes CCA checks for 20 megahertz (MHz) bandwidths of each subchannel of the plurality of subchannels, and the set of low power CCA thresholds includes a threshold of negative 82 decibel-milliwatts (dBm) for the 20 MHz bandwidths of each subchannel of the plurality of subchannels.

In some aspects, the one or more CCA checks includes a CCA check for an 80 MHz bandwidth of the wide bandwidth channel, and the set of low power CCA thresholds includes a second threshold of negative 82 dBm for the 80 MHz bandwidth.

In some aspects, the one or more CCA checks includes a CCA check for an 40 MHz bandwidth of the wide bandwidth channel, and the set of low power CCA thresholds includes a second threshold of negative 82 dBm for the 40 MHz bandwidth In addition, aspects of CCA for low power transmissions with a wide bandwidth channel can be integrated with any of the CCA configurations and processes described above. Process 1700 can be implemented with process 1100 or process 1400 as described above, as well as with any of the various aspects described for those processes above. Similarly, any configuration for CCA checks or examples described above can further include process 1700, either as part of a process for a separate mode, or as an aspect integrated with a process for a low power mode as described in process 1700 and FIG. 17. These different aspects can, in various examples, include the described blocks or other operations performed in parallel or in serial, and the described operations can further include repetitions and intervening operations that are not specifically described in accordance with some examples.

Figure 18:
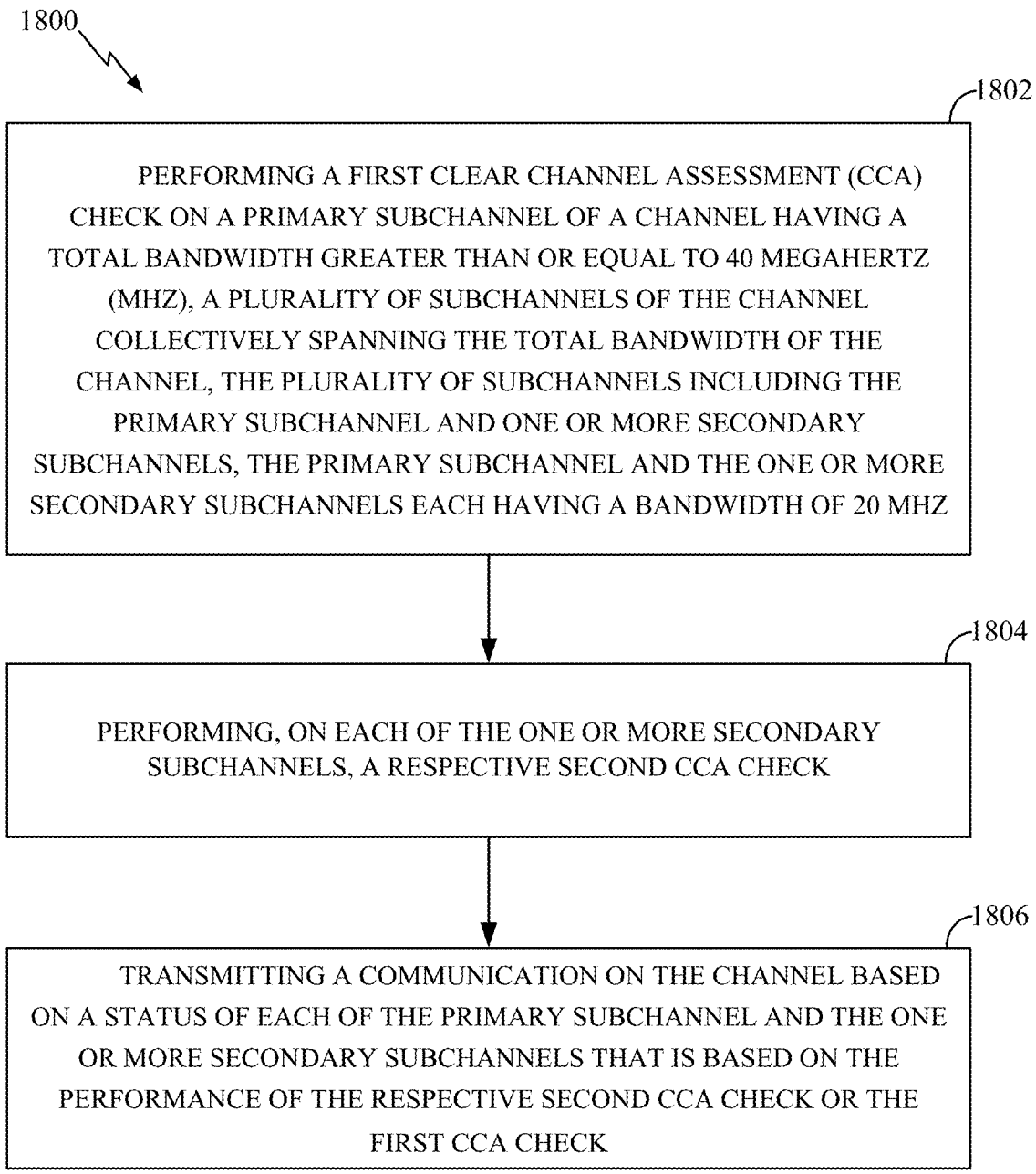
FIG. 18 shows a flowchart illustrating an example process that supports CCA, in accordance with some examples.

FIG. 18 shows a flowchart illustrating an example process 1800 that supports CCA for channels with 20 MHz subchannels according to some aspects. In some aspects, the process 1800 may be performed by a wireless communication device such as the wireless communication device 400 described above with reference to FIG. 4. In some aspects, the process 1800 may be performed by an AP or a STA, such as one of the APs 102 and 502 described above with reference to FIGS. 1 and 5A, respectively or a STA such as STA 104 or 504 described above with reference to FIGS. 1 and 5B respectively.

As described above, for example with respect to FIGS. 6, 12A, and 12B, a channel (e.g., channel 600, channel 1250, etc.) may have associated 20 MHz subchannels. In some aspects, a 20 MHz primary subchannel (e.g., subchannel 1260) can be used with secondary 20 MHz subchannels (e.g., subchannels 1261-1271) to cover an entire channel. By performing CCA on a per 20 MHz subchannel basis, all available 20 MHz bandwidths of the channel can be used (e.g., via puncture) even when portions of the channel (e.g., some secondary 20 MHz subchannels) are occupied or identified as busy by a CCA check of the channel (e.g., on a per 20 MHz basis. Process 1800 illustrates aspects of per 20 MHz CCA that can be used to improve device and system operation by increasing bandwidth utilization, and avoiding unused 20 MHz subchannels when portions of a channel are in use, but other 20 MHz subchannels are available.

In some aspects, in block 1802, the wireless communication device performs perform a first clear channel assessment (CCA) check on a primary subchannel of a channel having a total bandwidth greater than or equal to 40 megahertz (MHz), a plurality of subchannels of the channel collectively spanning the total bandwidth of the channel, the channel including the primary subchannel and one or more secondary subchannels, the primary subchannel and the one or more secondary subchannels each having a bandwidth of 20 MHz.

In some aspects, in block 1804, the wireless communication device performs respective second CCA checks for the one or more secondary subchannels of the channel. As described above, by performing CCA operations on 20 MHz subchannels, spectral efficiency can be improved by, for example, using 20 MHz of a 40 MHz bandwidth where a first secondary 20 MHz subchannel of the 40 MHz bandwidth is identified as busy by a CCA, but the other 20 MHz subchannel of the 40 MHz bandwidth identifies as available.

In some aspects, in block 1806, the wireless communication device performs a channel access operation by transmitting a communication on the channel based on a status of each of the primary subchannel and the one or more secondary subchannels. The Status is based on the performance of the CCA checks. In some aspects, the channel access (e.g., communication or other action) is based on determining whether the primary subchannel is idle and determining whether the one or more secondary subchannels are idle. Similar to the access operations described above, the access operation(s) of block 1806 can be a contention operation if the wide bandwidth channel is busy, a transmission if the wide bandwidth channel is idle, a puncturing transmission, or other such operations. By performing CCA on a per 20 MHz basis, CCA information is available for use of any combination of 20 MHz subchannels of the channel as part of the channel access operations of block 1806.

In some such aspects, the wireless communication device determines whether the primary subchannel is idle based on the first CCA check and also determines whether the one or more secondary subchannels are idle based on the respective second CCA checks. In some aspects, rather than performing different CCA checks on different bandwidths or different bandwidth subchannels, by only performing CCA on a per 20 MHz basis (e.g., per 20 MHz segment or subchannel), additional CCA checks are used, but overhead associated with CCA checks for different bandwidths (e.g., 40 MHz CCA, 80 MHz CCA, etc.) are removed, and spectral efficiency is increased as described above.

Figure 19:
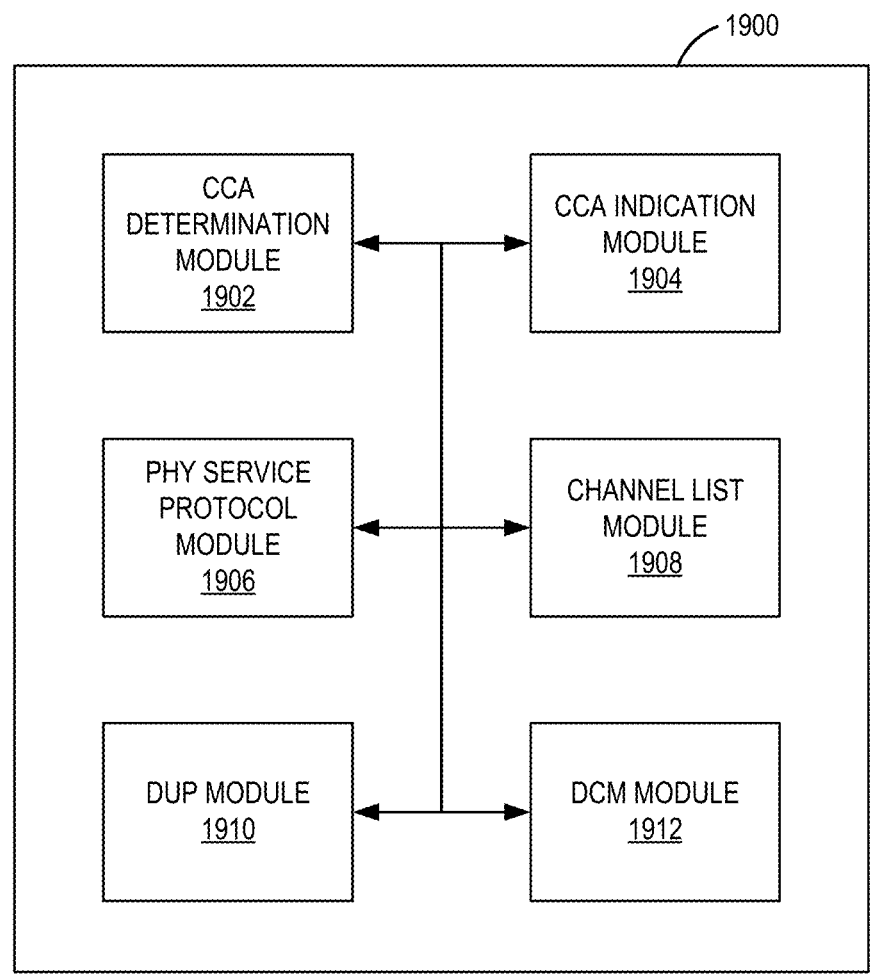
FIG. 19 shows a block diagram of an example wireless communication device that supports CCA for wide bandwidth channels, in accordance with some examples.

FIG. 19 shows a block diagram of an example wireless communication device 1900 that supports CCA for wide bandwidth channels according to some aspects. In some aspects, the wireless communication device 1900 is configured to perform one or more of the processes or CCA configurations described above. The configurations can include the CCA configuration with one or more secondary primary subchannels as described in FIGS. 9 and 10 and the associated process 1100 of FIG. 11, the configuration of FIG. 13 for a set of CCA checks at an intermediate bandwidth for an associated bitmap of a wide bandwidth channel and the associated process 1400 of FIG. 14, as well as any other CCA configuration or process described herein. The wireless communication device 1900 may be an example aspect of the wireless communication device 400 described above with reference to FIG. 4. For example, the wireless communication device 1900 can be a chip, SoC, chipset, package or device that includes at least one modem (for example, a Wi-Fi (IEEE 802.11) modem or a cellular modem such as the modem 402), at least one processor (such as the processor 404), at least one radio (such as the radio 406) and at least one memory (such as the memory 408). In some aspects, the wireless communication device 1900 can be a device for use in a STA, such as one of the STAs 104 and 504 described above with reference to FIGS. 1 and 5B, respectively. In some other aspects, the wireless communication device 1900 can be a STA that includes such a chip, SoC, chipset, package or device as well as at least one antenna (such as the antennas 525).

In some aspects, CCA operations described herein can be integrated with standardized communication system operation. For example, per 20 MHz CCA as described in process 1800 can be integrated with IEEE 802.11 standards. Example standard text for such an aspect is described below:

36.3.19.6 CCA Sensitivity 36.3.19.6.1 General

The thresholds in this subclause are compared with the signal level at each receiving antenna.

36.3.19.6.2 CCA Sensitivity for Operating Classes Requiring CCA-ED

For the operating classes requiring CCA-Energy Detect (CCA-ED), the PHY shall indicate a medium busy condition if CCA-ED detects a channel busy condition. For improved spectrum sharing, CCA-ED is required in some bands. The behavior class indicating CCA-ED is given in Table D-2 (Behavior limits). The operating classes requiring the corresponding CCA-ED behavior class are given in E.1 (Country information and operating classes). The PHY of a STA that is operating within an operating class that requires CCA-ED shall operate with CCA-ED.

CCA-ED shall detect a channel busy condition if the received signal strength exceeds the CCA-ED threshold as given by dot11OFDMEDThreshold for the primary 20 MHz channel and dot11OFDMEDThreshold for each nonprimary 20 MHz subchannel. The CCA-ED thresholds for the operating classes requiring CCA-ED are subject to the criteria in D.2.5 (CCA-ED threshold).

For the EHT TB PPDU transmission, for each of 20 MHz sub-channels that require CCA, CCA-ED shall detect a channel busy condition if the received signal strength exceeds the CCA-ED threshold as given by dot11OFDMEDThreshold. The CCA-ED thresholds for the operating classes requiring CCA-ED are subject to the criteria in D.2.5 (CCA-ED threshold). For transmissions that carry a frame that includes a BQR Control subfield (see 9.2.4.6a (Control subfield variants of an A-Control subfield)), CCA-ED shall detect a channel busy condition if the received signal strength exceeds the CCA-ED threshold as given by dot11OFDMEDThreshold for primary 20 MHz channel and dot11OFDMEDThreshold for each nonprimary 20 MHz channel (if present). The CCA-ED thresholds for the operating classes requiring CCA-ED are subject to the criteria in D.2.5 (CCA-ED threshold).

NOTE—The requirement to detect a channel busy condition as stated in 36.3.19.6.3 (CCA sensitivity for the primary 20 MHz channel) and 36.3.19.6.4 (Per 20 MHz CCA sensitivity) is a mandatory energy detect requirement on all Clause 36 (Extremely high throughput (EHT) PHY specification) receivers. Support for CCA-ED is an additional requirement that relates specifically to the sensitivities described in D.2.5 (CCA-ED threshold).

36.3.19.6.3 CCA Sensitivity for Occupying the Primary 20 MHz Channel

An EHT STA with a W MHz operating channel width shall detect, with >90% probability, the start of a PPDU that occupies at least the primary 20 MHz channel in an otherwise idle W MHz operating channel width, and issue a PHY-CCA.indication with the STATUS parameter set to BUSY within a period of aCCATime (see 21.4.4 (VHT PHY)) if one of the following conditions is met:

The start of a non-HT PPDU as defined in 17.3.10.6 (CCA requirements) when operating in the 5 or 6 GHz band and 18.4.6 (CCA performance) when operating in the 2.4 GHz band.

The start of an HT PPDU as defined in 19.3.19.5 (CCA sensitivity).

The start of a non-HT duplicate, VHT HE, or EHT PPDU for which the power measured within the primary 20 MHz channel is at or above −82 dBm.

The channel-list parameter is present and set to {primary} if the operating channel width is greater than 20 MHz. The CCA signal shall be held busy (not issue a PHY-CCA.indication primitive with the STATUS parameter set to IDLE) for the duration of the PPDU, unless it receives a CCARE-SET.request primitive before the end of the PPDU for instance during spatial reuse operation as described in 35.xx (Spatial reuse operation).

The receiver shall issue a PHY-CCA.indication primitive with the STATUS parameter set to BUSY for any signal that exceeds a threshold equal to 20 dB above the minimum modulation and coding rate sensitivity (−82+20=−62 dBm) in the primary 20 MHz channel within a period of aCCATime after the signal arrives at the receiver's antenna(s). If the operating channel width is greater than 20 MHz, then the channel-list parameter is present and shall be set to {primary}. Following the indication and while the threshold continues to be exceeded, the receiver shall not issue a PHY-CCA.indication primitive with the STATUS parameter set to IDLE or with a change in the channel-list parameter.

36.3.19.6.4 Per 20 MHz CCA Sensitivity

If the operating channel width is greater than 20 MHz and the PHY issues a PHY-CCA.indication primitive, the PHY shall set the per20bitmap to indicate the busy/idle status of each 20 MHz subchannel. A 20 MHz subchannel is busy if at least one of the following conditions is present:

A signal is present on the 20 MHz subchannel at or above a threshold of −62 dBm at the receiver's antenna(s). The PHY shall indicate that the 20 MHz subchannel is busy a period aCCATime after the signal starts and shall continue to indicate the 20 MHz subchannel is busy while the threshold continues to be exceeded.

A non-HT, HT_MF, HT_GF, VHT, HE, or EHT PPDU for which the power measured within this 20 MHz subchannel is at or above max(−72 dBm, OBSS_PDlevel) at the receiver's antenna(s). The PHY shall indicate that the 20 MHz subchannel is busy with >90% probability within a period aCCAMidTime (see 36.3 (EHT PHY)))

NOTE—Following the receipt of a Trigger frame with the CS Required subfield in the Common Info field set to 1, the EHT PHY is only required to detect a signal at the −62 dBm threshold since the other conditions require more time than is available before the response is expected.

OBSS_PDlevel is defined in 35.xx.x.x (Adjustment of OBSS PD and transmit power) and applied in the equations to define the detection level in this subclause if an EHT STA has ignored a 40 MHz, 80 MHz, 160 MHz, 320 MHz inter-BSS PPDU following the procedure in 35.xx.x.x (General operation with non-SRG OBSS PD level) or 35.xx.x.x (General operation with SRG OBSS PD level). It is applied to any secondary channels within the PPDU bandwidth of the inter-BSS PPDU and during the RXTIME of the inter-BSS PPDU. Otherwise, OBSS_PDlevel is not applied in the equations to define the detection level in this subclause.

27.3.20.6 CCA Sensitivity 27.3.20.6.1 General

The thresholds in this subclause are compared with the signal level at each receiving antenna.

27.3.20.6.2 CCA Sensitivity for Operating Classes Requiring CCA-ED

For the operating classes requiring CCA-Energy Detect (CCA-ED), the PHY shall indicate a medium busy condition if CCA-ED detects a channel busy condition. For improved spectrum sharing, CCA-ED is required in some bands. The behavior class indicating CCA-ED is given in Table D-2 (Behavior limits). The operating classes requiring the corresponding CCA-ED behavior class are given in E.1 (Country information and operating classes). The PHY of a STA that is operating within an operating class that requires CCA-ED shall operate with CCA-ED.

CCA-ED shall detect a channel busy condition if the received signal strength exceeds the CCA-ED threshold as given by dot11OFDMEDThreshold for the primary 20 MHz channel and dot11OFDMEDThreshold for each nonprimary 20 MHz subchannel. The CCA-ED thresholds for the operating classes requiring CCA-ED are subject to the criteria in D.2.5 (CCA-ED threshold).

For the EHT TB PPDU transmission, for each of 20 MHz sub-channels that require CCA, CCA-ED shall detect a channel busy condition if the received signal strength exceeds the CCA-ED threshold as given by dot11OFDMEDThreshold. The CCA-ED thresholds for the operating classes requiring CCA-ED are subject to the criteria in D.2.5 (CCA-ED threshold). For transmissions that carry a frame that includes a BQR Control subfield (see 9.2.4.6a (Control subfield variants of an A-Control subfield)), CCA-ED shall detect a channel busy condition if the received signal strength exceeds the CCA-ED threshold as given by dot11OFDMEDThreshold for primary 20 MHz channel and dot11OFDMEDThreshold for each nonprimary 20 MHz channel (if present). The CCA-ED thresholds for the operating classes requiring CCA-ED are subject to the criteria in D.2.5 (CCA-ED threshold).

NOTE—The requirement to detect a channel busy condition as stated in 27.3.20.6.3 (CCA sensitivity for the primary 20 MHz channel) and 27.3.20.6.4 (CCA sensitivity for signals not occupying the primary 20 MHz channel) is a mandatory energy detect requirement on all Clause 27 (High Efficiency (HE) PHY specification) receivers. Support for CCA-ED is an additional requirement that relates specifically to the sensitivities described in D.2.5 (CCA-ED threshold).

27.3.20.6.3 CCA Sensitivity for the Primary 20 MHz Channel

An EHT STA with a W MHz operating channel width shall detect, with >90% probability, the start of a PPDU that occupies at least the primary 20 MHz channel in an otherwise idle W MHz operating channel width, and issue a PHY-CCA.indication with the STATUS parameter set to BUSY within a period of aCCATime (see 21.4.4 (VHT PHY)) if one of the following conditions is met:

The start of a non-HT PPDU as defined in 17.3.10.6 (CCA requirements) when operating in the 5 or 6 GHz band and 18.4.6 (CCA performance) when operating in the 2.4 GHz band.

The start of an HT PPDU as defined in 19.3.19.5 (CCA sensitivity).

The start of a non-HT duplicate, VHT HE, or EHT PPDU for which the power measured within the primary 20 MHz channel is at or above −82 dBm.

The channel-list parameter is present and set to {primary} if the operating channel width is greater than 20 MHz. The CCA signal shall be held busy (not issue a PHY-CCA.indication primitive with the STATUS parameter set to IDLE) for the duration of the PPDU, unless it receives a CCARE-SET.request primitive before the end of the PPDU for instance during spatial reuse operation as described in 26.10 (Spatial reuse operation).

The receiver shall issue a PHY-CCA.indication primitive with the STATUS parameter set to BUSY for any signal that exceeds a threshold equal to 20 dB above the minimum modulation and coding rate sensitivity (−82+20=−62 dBm) in the primary 20 MHz channel within a period of aCCA-Time after the signal arrives at the receiver's antenna(s). If the operating channel width is greater than 20 MHz, then the channel-list parameter is present and shall be set to {primary}. Following the indication and while the threshold continues to be exceeded, the receiver shall not issue a PHY-CCA.indication primitive with the STATUS parameter set to IDLE or with a change in the channel-list parameter.

27.3.20.6.5 Per 20 MHz CCA Sensitivity

If the operating channel width is greater than 20 MHz and the PHY issues a PHY-CCA.indication primitive, the PHY shall set the per20bitmap to indicate the busy/idle status of each 20 MHz subchannel. A 20 MHz subchannel is busy if at least one of the following conditions is present in an otherwise idle 40 MHz, 80 MHz, 80+80 MHz or 160 MHz channel:

A signal is present on the 20 MHz subchannel at or above a threshold of −62 dBm at the receiver's antenna(s). The PHY shall indicate that the 20 MHz subchannel is busy a period aCCATime after the signal starts and shall continue to indicate the 20 MHz subchannel is busy while the threshold continues to be exceeded.

A non-HT, HT_MF, HT_GF, VHT, HE, or EHT PPDU at or above max(−72 dBm, OBSS_PDlevel) at the receiver's antenna(s) is present on the 20 MHz subchannel. The PHY shall indicate that the 20 MHz subchannel is busy with >90% probability within a period aCCAMid-Time (see 27.4.4 (HE PHY))).

NOTE—Following the receipt of a Trigger frame with the CS Required subfield in the Common Info field set to 1, the EHT PHY is only required to detect a signal at the −62 dBm threshold since the other conditions require more time than is available before the response is expected.

OBSS_PDlevel is defined in 26.10.2.4 (Adjustment of OBSS PD and transmit power) and applied in the equations to define the detection level in this subclause if an EHT STA has ignored a 40 MHz, 80 MHz, 160 MHz, or 80+80 MHz inter-BSS PPDU following the procedure in 26.10.2.2 (General operation with non-SRG OBSS PD level) or 26.10.2.3 (General operation with SRG OBSS PD level). It is applied to any secondary channels within the PPDU bandwidth of the inter-BSS PPDU and during the RXTIME of the inter-BSS PPDU. Otherwise, OBSS_PDlevel is not applied in the equations to define the detection level in this subclause.

In other aspects, other standards implementations in accordance with the descriptions provided herein can be used other than the example language described above.

The wireless communication device 1900 may include CCA determination module 1902, a CCA indication module 1904, a PHY service protocol module 1906, a channel list module 1908, a DUP module 1910, and a DCM module 1912. Portions of one or more of the modules 1902, 1904, 1906, 1908, 1910, and 1912 may be implemented at least in part in hardware or firmware. For example, the CCA indication module 1904 may be implemented at least in part by one or more modems (for example, a Wi-Fi (IEEE 802.11) modem). In some aspects, at least some of the modules 1902, 1904, 1906, and 1908 are implemented at least in part as software stored in a memory. For example, portions of one or more of the modules 1902, 1904, 1906, 1908, 1910, and 1912 can be implemented as non-transitory instructions (or "code") executable by at least one processor to perform the functions or operations of the respective module.

The CCA determination module 1902 may be configured to determine the idle or busy status of at least one primary channel and at least one secondary channel. The determination of the primary channel(s) and secondary channel(s) may be based on the channel list module 1908 breakdown of the wide bandwidth channel. As described herein CCA checks as part of a particular CCA can be implemented with different configurations, including CCA checks for multiple primary subchannels for a single wide bandwidth channel, serial CCA checks for varying bandwidths, or CCAs at an intermediate bandwidth for generation of a bitmap. CCA determination module 1902 may, in some aspects, be used to configure and manage the set of CCA checks used for CCA of a particular wide bandwidth channel.

The CCA indication module 1904 may be configured to generate the CCA indication to send from the PHY layer to the MAC layer. For example, the CCA indication may include an indicator (such as one of those in FIG. 4).

The PHY service protocol module 1906 may be configured to receive a CCA trigger from the MAC layer and initiate the CCA by the CCA determination module 1902. The PHY service protocol module 1906 also may be configured to provide the CCA indication generated by the CCA indication module 1904 to the MAC layer. The PHY service protocol module 1906 may implement the cross-layer communication between the MAC layer and the PHY layer.

The channel list module 1908 may be configured to determine the primary channel(s) and the secondary channel (s) associated with the wide bandwidth channel. For example, the channel list module 1908 may determine how to segment the portions of the wide bandwidth channel and then cause the CCA determination module 1902 to perform the CCA for the portions determined by the channel list module 1908.

The DUP module 1910 may be configured to enable transmissions on a wide bandwidth channel in a duplicate PPDU mode for low power transmissions. The DUP module 1910 can manage protocols and communication operations to enable such a mode and associated low power transmissions as part of wireless communications device 1900.

The DCM module 1912 may be configured to enable transmissions on a wide bandwidth channel in a dual carrier mode for low power transmissions. The DUP module 1910 can manage protocols and communication operations to enable such a mode and associated low power transmissions as part of wireless communications device 1900. In some examples, the DUP module 1910 and the DCM module 1912 can be implemented together or can operate together to allow DUP and DCM transmissions at the same time in a DUP+DCM mode. Such a mode can further implement low power transmissions with CCA for a wide bandwidth channel in accordance with various examples described herein.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations and algorithm processes described in connection with the aspects disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the aspects described in this disclosure may be readily apparent to persons having ordinary skill in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Various features that are described in this specification in the context of separate aspects also can be implemented in combination in a single aspect. Conversely, various features that are described in the context of a single aspect also can be implemented in multiple aspects separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

Illustrative aspects of the present disclosure include:

Aspect 1: A method for wireless communication by a wireless communication device comprising: performing a first one or more clear channel assessment (CCA) checks on a primary segment of a wide bandwidth channel having a total bandwidth greater than or equal to 240 megahertz (MHz), a plurality of subchannels of the wide bandwidth channel collectively spanning the total bandwidth of the wide bandwidth channel, the wide bandwidth channel including the primary segment and one or more secondary segments, the primary segment including a first primary subchannel; performing a respective second CCA checks for the one or more secondary segments of the wide bandwidth channel, the one or more secondary segments including one or more secondary primary subchannels; determining whether the primary segment is idle based on the first one or more CCA checks; determining whether the one or more secondary segments are idle based on the respective second CCA checks; and performing a wide bandwidth channel access operation based on determining whether the primary segment is idle and determining whether the one or more secondary segments are idle.

Aspect 2: The method of aspect 1, wherein the primary segment has a bandwidth of 160 MHz and includes a plurality of secondary subchannels.

Aspect 3: The method of any one of aspects 1-2, wherein the one or more secondary segments have a collective bandwidth of 80 MHz.

Aspect 4: The method of any one of aspects 1-2, wherein the one or more secondary segments have a collective bandwidth of 160 MHz.

Aspect 5: The method of any one of aspects 1-4, further comprising: generating one or more CCA indication reports based on at least one of the first one or more CCA checks and the respective second CCA checks, the one or more CCA indication reports including an indication of a status of the first primary subchannel of the primary segment and at least one secondary primary subchannel of the one or more secondary primary subchannels; and wherein performing the wide bandwidth channel access operation is based on the one or more CCA indication reports.

Aspect 6: The method of aspect 5, wherein the one or more CCA indication reports include a first CCA report for the primary segment and at least a second CCA report for the one or more secondary segments.

Aspect 7: The method of aspect 6, wherein the wide bandwidth channel access operation includes transmitting data using the wide bandwidth channel based on the first CCA report and the second CCA report.

Aspect 8: The method of any one of aspects 1-7, wherein the wide bandwidth channel access operation includes transmitting data using the wide bandwidth channel based on at least one of a determination that the primary segment is idle and a determination that the one or more secondary segments are idle.

Aspect 9: The method of any one of aspects 1-7, wherein the wide bandwidth channel access operation includes refraining from transmitting data on the wide bandwidth channel during a backoff period in response to a determination that the primary segment is busy and a determination that the one or more secondary segments are busy.

Aspect 10: The method of aspect 9, wherein the backoff period of the wide bandwidth channel access operation includes a joint backoff period shared by the plurality of subchannels.

Aspect 11: The method of aspect 10, wherein the joint backoff period of the wide bandwidth channel access operation includes a random backoff time and an interframe spacing time.

Aspect 12: The method of aspect 9, wherein the backoff period of the wide bandwidth channel access operation includes a first backoff period for the first primary subchannel and the one or more secondary primary subchannels, and at least one second backoff period for a plurality of secondary subchannels of the plurality of subchannels, the at least one second backoff period being different from the first backoff period.

Aspect 13: The method of any one of aspects 1-7, wherein the wide bandwidth channel access operation includes transmitting data on at least one of the one or more secondary segments of the wide bandwidth channel and refraining from transmitting data on the primary segment based on a determination that the primary segment is busy and a determination that the at least one of the one or more secondary segments is idle.

Aspect 14: The method of any one of aspects 1-7, wherein the wide bandwidth channel access operation includes transmitting data on a puncture set of the primary segment and the one or more secondary segments in accordance with a preamble puncturing pattern matching corresponding idle values from the first one or more CCA checks and the respective second CCA checks.

Aspect 15: The method of aspect 14, wherein the wide bandwidth channel access operation further includes communicating on a first portion of the plurality of subchannels and a second portion of the plurality of subchannels based on a resource unit allocation for the primary segment and the one or more secondary segments of the wide bandwidth channel.

Aspect 16: The method of any one of aspects 1-15, wherein the first one or more CCA checks includes a full CCA check for the first primary subchannel and a point coordination function (PCF) interframe space (PIFS) check for one or more secondary subchannels of the plurality of subchannels of each segment in the wide bandwidth channel.

Aspect 17: The method of aspect 1, wherein the total bandwidth of the wide bandwidth channel is 320 MHz.

Aspect 19: The method of aspect 17, wherein the primary segment has a primary segment bandwidth of 160 MHz, the one or more secondary segments include a secondary segment with a secondary segment bandwidth of 160 MHz, and wherein each of the plurality of subchannels has a corresponding subchannel bandwidth of 20 MHz.

Aspect 19: The method of aspect 19, wherein a first CCA check of the first one or more CCA checks for the total bandwidth of 320 MHz has a first CCA threshold of negative 70 decibel-milliwatts (dBm).

Aspect 20: The method of aspect 19, wherein a second CCA check of the respective second CCA checks for the secondary segment bandwidth of 160 MHz has a second CCA threshold of negative 73 dBm.

Aspect 21: The method of aspect 20, further comprising performing a third CCA check for the first primary subchannel, the third CCA check having a third CCA threshold of negative 62 dBm.

Aspect 22: The method of aspect 1, wherein the total bandwidth of the wide bandwidth channel is 240 MHz.

Aspect 23: The method of aspect 22, wherein the primary segment has a primary segment bandwidth of 160 MHz, the one or more secondary segments include a secondary segment with a secondary segment bandwidth of 80 MHz, and wherein each of the plurality of subchannels has a corresponding subchannel bandwidth of 20 MHz.

Aspect 24: The method of aspect 23, wherein a first CCA check of the first one or more CCA checks for the total bandwidth of 240 MHz has a first CCA threshold of negative 71 dBm.

Aspect 25: The method of aspect 24, wherein a second CCA check of the respective second CCA checks for the secondary segment bandwidth of 80 MHz has a second CCA threshold of negative 76 dBm.

Aspect 26: The method of aspect 25, further comprising performing a third CCA check for the first primary subchannel, the third CCA check having s a third CCA threshold of negative 62 dBm.

Aspect 27: The method of aspect 1, wherein the first one or more CCA checks includes CCA checks for each 20 MHz bandwidth of the primary segment.

Aspect 28: The method of any one of aspects 1-23, wherein the first one or more CCA checks includes CCA checks for each subchannel of the primary segment, CCA checks for each 40 MHz bandwidth of the primary segment, CCA checks for each 80 MHz bandwidth of the primary segment, and a 160 MHz CCA check for the primary segment.

Aspect 29: The method of aspect 28, wherein the respective second CCA checks includes CCA checks for each subchannel of the one or more secondary segments, CCA checks for each 40 MHz bandwidth of the one or more secondary segments, and a full bandwidth CCA check for each secondary segment of the one or more secondary segments.

Aspect 30: The method of aspect 1, wherein each CCA check of the first one or more CCA checks is performed serially.

Aspect 31: The method of any one of aspects 1-23 wherein the first one or more CCA checks includes a first CCA check for the first primary subchannel, a third plurality of CCA checks for secondary subchannels of the primary segment, one or more second CCA checks for each secondary primary subchannel of the one or more secondary segments, and a fourth plurality of CCA checks for secondary subchannels of the one or more secondary segments.

Aspect 32: The method of aspect 31, wherein the third plurality of CCA checks are performed in parallel after the first CCA check identifies an idle value for the first primary subchannel.

Aspect 33: The method of any one of aspects 1-23, wherein the first one or more CCA checks includes a first plurality of CCA checks and wherein the respective second CCA checks includes a second plurality of CCA checks.

Aspect 34: The method of aspect 33, wherein the first plurality of CCA checks includes a primary channel CCA check that generates an indication of an idle value for the first primary subchannel, and wherein the second plurality of CCA checks includes at least one secondary primary channel CCA check that generates at least one indication of an idle value for the one or more secondary primary subchannels.

Aspect 35: A method for wireless communication by a wireless communication device comprising: performing at least a first clear channel assessment (CCA) check on a first bandwidth of a wide bandwidth channel having a total bandwidth greater than or equal to 240 MHz, a plurality of subchannels collectively spanning the total bandwidth of the wide bandwidth channel, the first bandwidth having a value greater than or equal to 40 megahertz (MHz) and being separate from a primary subchannel of the wide bandwidth channel, each CCA check performed on the first bandwidth being performed on a bandwidth segment greater than or equal to 40 MHz; performing one or more CCA checks on the plurality of subchannels that make up the wide bandwidth channel; determining whether the wide bandwidth channel is idle based on the first CCA check and the one or more CCA checks; and performing a wide bandwidth channel access operation based on determining whether the wide bandwidth channel is idle.

Aspect 36: The method of aspect 35, wherein the wide bandwidth channel includes a primary 40 MHz bandwidth and a plurality of secondary 40 MHz bandwidths.

Aspect 37: The method of aspect 36, wherein the one or more CCA checks includes a CCA check for the primary 40 MHz bandwidth and a corresponding CCA check for each of the plurality of secondary 40 MHz bandwidths.

Aspect 38: The method of aspect 37, wherein the wide bandwidth channel access operation includes transmitting on a first subset of the plurality of secondary 40 MHz bandwidths in accordance with a preamble puncturing pattern matching a set of idle values from a portion of the one or more CCA checks for a first set of the plurality of secondary 40 MHz bandwidths.

Aspect 39: The method of aspect 35, wherein the wide bandwidth channel access operation includes communicating on the primary subchannel and at least a first 80 MHz bandwidth in accordance with a preamble puncturing pattern matching one or more idle values generated by the one or more CCA checks.

Aspect 40: The method of aspect 35, wherein the wide bandwidth channel is segmented into a primary segment and one or more secondary segments.

Aspect 41: The method of aspect 40, wherein the primary segment has a primary segment bandwidth of 160 MHz.

Aspect 42: The method of aspect 41, wherein the one or more CCA checks include a first plurality of CCA checks on each 20 MHz bandwidth of the primary segment, and wherein the first bandwidth is in the one or more secondary segments.

Aspect 43: The method of aspect 42, wherein the one or more CCA checks include a second plurality of CCA checks on each 40 MHz bandwidth of the one or more secondary segments other than the first bandwidth.

Aspect 44: The method of aspect 40, wherein the primary segment has a primary segment bandwidth of 80 MHz, wherein the wide bandwidth channel does not include a primary 160 MHz bandwidth, and the total bandwidth of the wide bandwidth channel is 240 MHz.

Aspect 45: The method of aspect 44, wherein the one or more CCA checks include a first plurality of CCA checks on each 20 MHz bandwidth of the primary segment, and wherein the first bandwidth is in the one or more secondary segments.

Aspect 46: The method of aspect 45, wherein the one or more CCA checks include a second plurality of CCA checks on each 40 MHz bandwidth of the one or more secondary segments other than the first bandwidth.

Aspect 47: The method of aspect 35, wherein a second CCA check for a secondary subchannel different from the first bandwidth has an energy detection threshold of negative 62 dBm when a wireless preamble is not detected, wherein the secondary subchannel has a 20 MHz bandwidth.

Aspect 48: The method of aspect 35, wherein a second CCA check for the first bandwidth has an energy detection threshold of negative 59 dBm when a wireless preamble is not detected.

Aspect 49: The method of aspect 35, wherein a second CCA check for a secondary 160 MHz bandwidth of the wide bandwidth channel has an energy detection threshold of negative 53 dBm when a wireless preamble is not detected.

Aspect 50: The method of aspect 35, wherein a physical (PHY) layer of the wireless communication device is constrained so that the wireless communication device does not perform any CCA check any portion of the wide bandwidth channel smaller than 40 MHz.

Aspect 51: The method of aspect 50, further comprising generating a per 40 MHz bitmap indicating a busy value or an idle value for each 40 MHz bandwidth of the wide bandwidth channel.

Aspect 52: A method for wireless communication by a wireless communication device comprising: configuring the wireless communication device to operate in a duplication mode for low power transmissions on a channel of a wide bandwidth channel having a bandwidth greater than 20 megahertz (MHz), a plurality of subchannels of the wide bandwidth channel collectively spanning a total bandwidth of the wide bandwidth channel; based on configuring the wireless communication device to operate in a dual carrier mode, performing one or more clear channel assessment (CCA) checks on the wide bandwidth channel using a set of low power CCA thresholds, the wide bandwidth channel being associated with a first set of CCA thresholds different than the set of low power CCA thresholds, the first set of CCA thresholds being used when the wireless communication device is not operating in the duplication mode for low power transmissions; determining whether the wide bandwidth channel is idle based on the one or more CCA checks; and performing a wide bandwidth channel access operation based on determining whether the wide bandwidth channel is idle.

Aspect 53: The method of aspect 52, wherein the wireless communication device is further configured for a dual carrier mode in addition to the duplication mode for the low power transmissions.

Aspect 54: The method of aspect 52, wherein the one or more CCA checks includes CCA checks for 20 megahertz (MHz) bandwidths of each subchannel of the plurality of subchannels, and wherein the set of low power CCA thresholds includes a threshold of negative 82 decibel-milliwatts (dBm) for the 20 MHz bandwidths of each subchannel of the plurality of subchannels.

Aspect 55: The method of aspect 54, wherein the one or more CCA checks includes a CCA check for an 80 MHz bandwidth of the wide bandwidth channel, and wherein the set of low power CCA thresholds includes a second threshold of negative 82 dBm for the 80 MHz bandwidth.

Aspect 56: The method of aspect 54, wherein the one or more CCA checks includes a CCA check for an 40 MHz bandwidth of the wide bandwidth channel, and wherein the set of low power CCA thresholds includes a second threshold of negative 82 dBm for the 40 MHz bandwidth.

Aspect 57: A wireless communication device, comprising: at least one modem; at least one processor communicatively coupled with the at least one modem; and at least one memory communicatively coupled with the at least one processor and storing processor-readable code that, when executed by the at least one processor in conjunction with the at least one modem, is configured to perform the method of any of aspects 1-56 above.

Aspect 58: A mobile station, comprising: at least one modem; at least one processor communicatively coupled with the at least one modem; at least one memory communicatively coupled with the at least one processor and storing processor-readable code that, when executed by the at least one processor in conjunction with the at least one modem, is configured to perform the method of any of aspects 1-56 above; at least one transceiver coupled to the at least one modem; at least one antenna coupled to the at least one transceiver to wirelessly transmit signals output from the at least one transceiver and to wirelessly receive signals for input into the at least one transceiver; and a housing that encompasses the at least one modem, the at least one processor, the at least one memory, the at least one transceiver and at least a portion of the at least one antenna.

Aspect 59: A method for wireless communication by a wireless communication device comprising: performing a first clear channel assessment (CCA) check on a primary subchannel of a channel having a total bandwidth greater than or equal to 40 megahertz (MHz), a plurality of subchannels of the channel collectively spanning the total bandwidth of the channel, the plurality of subchannels including the primary subchannel and one or more secondary subchannels, the primary subchannel and the one or more secondary subchannels each having a bandwidth of 20 MHz; performing, on each of the one or more secondary subchannels, a respective second CCA check; and transmitting a communication on the channel based on a status of each of the primary subchannel and the one or more secondary subchannels that is based on the performance of the respective second CCA check or the first CCA check.

Aspect 60: The method of aspect 59, further comprising: determining whether the primary subchannel is idle based on the first CCA check; and determining, for each of the one or more secondary subchannels, whether a respective secondary subchannel is idle based on the respective second CCA check performed on the respective secondary subchannel.

Aspect 61: The method of aspect 60, wherein determining whether the primary subchannel is idle comprises an energy detection CCA (CCA-ED) check for the primary subchannel; and wherein determining for each of the one or more secondary subchannels, whether the respective secondary subchannel is idle comprises a corresponding CCA-ED for each of the one or more secondary subchannels.

Aspect 62: The method of aspect 61, wherein the CCA-ED check for the primary subchannel and the corresponding CCA-ED for each of the one or more secondary subchannels each comprise a negative 62 dBm threshold check.

Aspect 63: The method of aspect 60, wherein determining whether the primary subchannel is idle further comprises a preamble detection CCA (CCA-PD) check for the primary subchannel; and wherein determining for each of the one or more secondary subchannels, whether the respective secondary subchannel is idle further comprises a corresponding CCA-PD for each of the one or more secondary subchannels.

Aspect 64: The method of aspect 63, wherein the CCA-PD check for the primary subchannel comprises a negative 82 dBm threshold check.

Aspect 65: The method of aspect 64, wherein the corresponding CCA-PD for each of the one or more secondary subchannels comprises a threshold of negative 72 dBm.

Aspect 66: The method of any of aspects 60-65, wherein the channel has a collective bandwidth of 40 MHz, 80 MHz, 160 MHz, or 320 MHz.

Aspect 67: The method of any one of any of aspects 60-66, further comprising: generating one or more CCA indication reports based on at least one of the first CCA check and the respective second CCA checks, the one or more CCA indication reports including an indication of a status each 20 MHz subchannel of the channel.

Aspect 68: The method of aspect 67, wherein the one or more CCA indication reports include a first CCA report for the primary subchannel and at least a second CCA report for the one or more secondary subchannels.

Aspect 69: The method of any one of aspects 60-68, wherein transmitting the communication on the channel includes transmitting data using the channel based on at least one of a determination that the primary subchannel is idle and a determination that the one or more secondary subchannels are idle.

Aspect 70: The method of any one of aspects 60-69, wherein transmitting the communication on the channel includes transmitting data on a puncture set of the primary subchannel and the one or more secondary subchannels in accordance with a preamble puncturing pattern matching corresponding idle values from the first CCA check and the respective second CCA checks.

Aspect 71: The method of aspect 70, wherein the transmitting the communication on the channel further includes communicating on a first portion of the plurality of subchannels and a second portion of the plurality of subchannels based on a resource unit allocation for the primary subchannel and the one or more secondary subchannels of the channel.

Aspect 72: The method of aspect 71, wherein the first CCA check has a first CCA threshold of negative 62 dBm.

Aspect 73: The method of aspect 72, wherein each CCA check of the first CCA check and the respective second CCA checks is performed serially.

Aspect 74: The method of aspect any one of aspects 60-73, wherein the first CCA check, the respective second CCA checks, and transmitting the communication on the channel are performed by an access point (AP) or a mobile station (STA) in a wireless network.

Aspect 75: A wireless communication device, comprising: at least one modem; at least one processor communicatively coupled with the at least one modem; and at least one memory communicatively coupled with the at least one processor and storing processor-readable code that, when executed by the at least one processor in conjunction with the at least one modem, is configured to: perform a first clear channel assessment (CCA) check on a primary subchannel of a channel having a total bandwidth greater than or equal to 40 megahertz (MHz), a plurality of subchannels of the channel collectively spanning the total bandwidth of the channel, the channel including the primary subchannel and one or more secondary subchannels, the primary subchannel and the one or more secondary subchannels each having a bandwidth of 20 MHz; perform, on each of the one or more secondary subchannels, a respective second CCA check; and cause a communication to be transmitted on the channel based on a status of each of the primary subchannel and the one or more secondary subchannels that is based on the performance of the respective first or second CCA check.

Aspect 76: The wireless communication device of aspect 75, wherein the at least one memory communicatively coupled with the at least one processor and storing the processor-readable code that, when executed by the at least one processor in conjunction with the at least one modem, is configured to: determining whether the primary subchannel is idle based on the first CCA check; and determining, for each of the one or more secondary subchannels, whether a respective secondary subchannel is idle based on the respective second CCA check performed on the respective secondary subchannel.

Aspect 77: The wireless communication device of aspect 76, wherein, to determine whether the primary subchannel is idle, the at least one memory communicatively coupled with the at least one processor and storing the processor-readable code that, when executed by the at least one processor in conjunction with the at least one modem, is configured to perform an energy detection CCA (CCA-ED) check for the primary subchannel; and wherein, to determine for each of the one or more secondary subchannels whether the respective secondary subchannel is idle, the at least one memory communicatively coupled with the at least one processor and storing the processor-readable code that, when executed by the at least one processor in conjunction with the at least one modem, is configured to perform a corresponding CCA-ED for each of the one or more secondary subchannels.

Aspect 78: The wireless communication device of aspect 77, wherein the CCA-ED check for the primary subchannel and the corresponding CCA-ED for each of the one or more secondary subchannels each comprise a negative 62 dBm threshold check.

Aspect 79: The wireless communication device of aspect 76, wherein, to determine whether the primary subchannel is idle, the at least one memory communicatively coupled with the at least one processor and storing the processor-readable code that, when executed by the at least one processor in conjunction with the at least one modem, is configured to perform a preamble detection CCA (CCA-PD) check for the primary subchannel; and wherein, to determine for each of the one or more secondary subchannels whether the respective secondary subchannel is idle, the at least one memory communicatively coupled with the at least one processor and storing the processor-readable code that, when executed by the at least one processor in conjunction with the at least one modem, is configured to perform a corresponding CCA-PD for each of the one or more secondary subchannels.

Aspect 80: The wireless communication device of aspect 79 wherein a preamble detection CCA (CCA-PD) check for the primary subchannel comprises a negative 82 dBm threshold.

Aspect 81: The wireless communication device of aspect 80, wherein the channel has a collective bandwidth of 40 MHz, 80 MHz, 160 MHz, or 320 MHz.

Aspect 82: The wireless communication device of aspect 80, wherein the at least one memory communicatively coupled with the at least one processor and storing the processor-readable code that, when executed by the at least one processor in conjunction with the at least one modem, is further configured to: generate one or more CCA indication reports based on at least one of the first CCA check and the respective second CCA checks, the one or more CCA indication reports including an indication of a status each 20 MHz subchannel of the channel.

Aspect 83: The wireless communication device of aspect 82, wherein the one or more CCA indication reports include a first CCA report for the primary subchannel and at least a second CCA report for the one or more secondary subchannels.

Aspect 84: The wireless communication device of any one of aspects 75-83, wherein, to cause the communication to be transmitted on the channel, the at least one memory communicatively coupled with the at least one processor and storing the processor-readable code that, when executed by the at least one processor in conjunction with the at least one modem, is configured to cause data to be transmitted using the channel based on at least one of a determination that the primary subchannel is idle and a determination that the one or more secondary subchannels are idle.

Aspect 85: The wireless communication device of any one of aspects 75-84, wherein, to cause the communication to be transmitted on the channel, the at least one memory communicatively coupled with the at least one processor and storing the processor-readable code that, when executed by the at least one processor in conjunction with the at least one modem, is configured to cause data to be transmitted on a puncture set of the primary subchannel and the one or more secondary subchannels in accordance with a preamble puncturing pattern matching corresponding idle values from the first CCA check and the respective second CCA checks.

Aspect 86: The wireless communication device of aspect 85, wherein, to cause the communication to be transmitted on the channel, the at least one memory communicatively coupled with the at least one processor and storing the processor-readable code that, when executed by the at least one processor in conjunction with the at least one modem, is configured to cause data to be transmitted on a first portion of the plurality of subchannels and a second portion of the plurality of subchannels based on a resource unit allocation for the primary subchannel and the one or more secondary subchannels of the channel.

Aspect 87: The wireless communication device of aspect 88, wherein the first CCA check has a first CCA threshold of negative 62 dBm, and wherein each CCA check of the first CCA check and the respective second CCA checks is performed serially.

Aspect 88: The wireless communication device of any one of aspects 75-87, wherein the wireless communication device is an access point (AP) or a mobile station (STA).

Aspect 89: A method in accordance with any of the operations of aspects 1-56 above.

Aspect 90: A computer readable storage medium comprising instructions that, when executed by one or more processors of a device, cause the device to perform the operations of any of aspects 1-56 above.

Aspect 91: An apparatus comprising one or more means for performing any of the operations of aspects 1-56 above.

What is claimed is:

1. A method for wireless communication by a wireless communication device comprising:
   performing a primary bandwidth clear channel assessment (CCA) check of a first CCA on a primary subchannel of a first bandwidth segment of a channel having a total bandwidth greater than or equal to 80 megahertz (MHz), wherein a plurality of subchannels of the channel collectively spans the total bandwidth of the channel, the plurality of subchannels including the primary subchannel of the first bandwidth segment, one or more secondary subchannels of the first bandwidth segment, a secondary primary subchannel of a second bandwidth segment of the channel, and one or more secondary subchannels of the second bandwidth segment, each subchannel of the plurality of subchannels having a bandwidth of 20 MHz;
   performing one or more secondary bandwidth CCA checks of the first CCA on the one or more secondary subchannels of the first bandwidth segment;
   performing a primary bandwidth CCA check of a second CCA on the secondary primary subchannel of the second bandwidth segment of the channel, wherein the second CCA is independent of the first CCA;
   performing one or more secondary bandwidth CCA checks of the second CCA on the one or more secondary subchannels of the second bandwidth segment; and
   transmitting a communication on the channel based on a respective status of each of the primary subchannel of the first bandwidth segment, the one or more secondary subchannels of the first bandwidth segment, the secondary primary subchannel of the second bandwidth segment, and the one or more secondary subchannels of the second bandwidth segment, the respective status being based on the performance of at least one of the primary bandwidth CCA check of the first CCA, the one or more secondary bandwidth CCA checks of the first CCA, the primary bandwidth CCA check of the second CCA, or the one or more secondary bandwidth CCA checks of the second CCA.

2. The method of claim 1, further comprising:
determining whether the primary subchannel of the first bandwidth segment of the channel is idle based on the primary bandwidth CCA check of the first CCA; and
determining whether the one or more secondary subchannels of the first bandwidth segment are idle based on the one or more secondary bandwidth CCA checks of the first CCA performed on the one or more secondary subchannels.

3. The method of claim 2, wherein determining whether the primary subchannel of the first bandwidth segment of the channel is idle comprises performing an energy detection CCA (CCA-ED) check for the primary subchannel of the first bandwidth segment; and
wherein determining whether the one or more secondary subchannels of the first bandwidth segment are idle comprises performing one or more CCA-ED checks for the one or more secondary subchannels.

4. The method of claim 3, wherein the CCA-ED check for the primary subchannel of the first bandwidth segment of the channel and the one or more CCA-ED checks for the one or more secondary subchannels of the first bandwidth segment each comprise a negative 62 dBm threshold check.

5. The method of claim 2, wherein determining whether the primary subchannel of the first bandwidth segment of the channel is idle further comprises performing a preamble detection CCA (CCA-PD) check for the primary subchannel of the first bandwidth segment; and
wherein determining whether the one or more secondary subchannels of the first bandwidth segment are idle further comprises performing one or more CCA-PD checks for the one or more secondary subchannels.

6. The method of claim 5, wherein the CCA-PD check for the primary subchannel of the first bandwidth segment of the channel comprises a negative 82 dBm threshold check.

7. The method of claim 6, wherein the one or more CCA-PD checks for the one or more secondary subchannels of the first bandwidth segment of the channel comprise a threshold of negative 72 dBm.

8. The method of claim 1, wherein the channel has a collective bandwidth of 80 MHz, 160 MHz, or 320 MHz.

9. The method of claim 1, further comprising:
generating one or more CCA indication reports based on at least one of the primary bandwidth CCA check of the first CCA, the one or more secondary bandwidth CCA checks of the first CCA, the primary bandwidth CCA check of the second CCA, or the one or more secondary bandwidth CCA checks of the second CCA, the one or more CCA indication reports including an indication of a status each 20 MHz subchannel of the channel.

10. The method of claim 9, wherein the one or more CCA indication reports include a first CCA report for the primary subchannel of the first bandwidth segment of the channel, at least a second CCA report for the one or more secondary subchannels of the first bandwidth segment, a third CCA report for the secondary primary subchannel of the second bandwidth segment of the channel, and at least a fourth CCA report for the one or more secondary subchannels of the second bandwidth segment.

11. The method of claim 1, wherein transmitting the communication on the channel includes transmitting data using the channel based on at least one of a determination that the primary subchannel of the first bandwidth segment of the channel is idle, a determination that the one or more secondary subchannels of the first bandwidth segment are idle, a determination that the secondary primary subchannel of the second bandwidth segment of the channel is idle, or a determination that the one or more secondary subchannels of the second bandwidth segment are idle.

12. The method of claim 1, wherein transmitting the communication on the channel includes transmitting data on at least one puncture set of the primary subchannel of the first bandwidth segment of the channel, the one or more secondary subchannels of the first bandwidth segment, the secondary primary subchannel of the second bandwidth segment of the channel, and the one or more secondary subchannels of the second bandwidth segment in accordance with a preamble puncturing pattern matching corresponding idle values from the primary bandwidth CCA check of the first CCA, the one or more secondary bandwidth CCA checks of the first CCA, the primary bandwidth CCA check of the second CCA, and the one or more secondary bandwidth CCA checks of the second CCA.

13. The method of claim 12, wherein the transmitting the communication on the channel further includes communicating on the first bandwidth segment of the channel and the second bandwidth segment of the channel based on a resource unit allocation for the first bandwidth segment of the channel and second bandwidth segment of the channel.

14. The method of claim 13, wherein the primary bandwidth CCA check of the first CCA has a first CCA threshold of negative 62 dBm, and the primary bandwidth CCA check of the second CCA has a second CCA threshold of negative 66 dBm.

15. The method of claim 14, wherein each CCA check of the primary bandwidth CCA check of the first CCA and the one or more secondary bandwidth CCA checks of the first CCA are performed serially.

16. The method of claim 1, wherein the primary bandwidth CCA check of the first CCA, the one or more secondary bandwidth CCA checks of the first CCA, the primary bandwidth CCA check of the second CCA, the one or more secondary bandwidth CCA checks of the second CCA, and transmitting the communication on the channel are performed by an access point (AP) or a mobile station (STA) in a wireless network.

17. The method of claim 1, wherein:
performing the one or more secondary bandwidth CCA checks of the first CCA on the one or more secondary subchannels of the first bandwidth segment comprises performing a respective secondary bandwidth CCA check of the first CCA on each of the one or more secondary subchannels of the first bandwidth segment; and
performing the one or more secondary bandwidth CCA checks of the second CCA on the one or more secondary subchannels of the second bandwidth segment comprises performing a respective secondary bandwidth CCA check of the second CCA on each of the one or more secondary subchannels of the second bandwidth segment.

18. A wireless communication device, comprising:
at least one modem;
at least one processor communicatively coupled with the at least one modem; and at least one memory communicatively coupled with the at least one processor and storing processor-readable code that, when executed by the at least one processor in conjunction with the at least one modem, is configured to:
  perform a primary bandwidth clear channel assessment (CCA) check of a first CCA on a primary subchannel of a first bandwidth segment of a channel having a total bandwidth greater than or equal to 80 megahertz (MHz), wherein a plurality of subchannels of the channel collectively spans the total bandwidth of the channel, the plurality of subchannels including the primary subchannel of the first bandwidth segment, one or more secondary subchannels of the first bandwidth segment, a secondary primary subchannel of a second bandwidth segment of the channel, and one or more secondary subchannels of the second bandwidth segment, each subchannel of the plurality of subchannels having a bandwidth of 20 MHz;
  perform one or more secondary bandwidth CCA checks of the first CCA on the one or more secondary subchannels of the first bandwidth segment;
  perform a primary bandwidth CCA check of a second CCA on the secondary primary subchannel of the second bandwidth segment of the channel, wherein the second CCA is independent of the first CCA;
  perform one or more secondary bandwidth CCA checks of the second CCA on the one or more secondary subchannels of the second bandwidth segment; and
  cause a communication to be transmitted on the channel based on a respective status of each of the primary subchannel of the first bandwidth segment, the one or more secondary subchannels of the first bandwidth segment, the secondary primary subchannel of the second bandwidth segment, and the one or more secondary subchannels of the second bandwidth segment, the respective status being based on the performance of at least one of the primary bandwidth CCA check of the first CCA, the one or more secondary bandwidth CCA checks of the first CCA, the primary bandwidth CCA check of the second CCA, or the one or more secondary bandwidth CCA checks of the second CCA.

19. The wireless communication device of claim 18, wherein the at least one memory communicatively coupled with the at least one processor and storing the processor-readable code that, when executed by the at least one processor in conjunction with the at least one modem, is configured to:
  determine whether the primary subchannel of the first bandwidth segment of the channel is idle based on the primary bandwidth CCA check of the first CCA; and
  determine whether the one or more secondary subchannels of the first bandwidth segment are idle based on the one or more secondary bandwidth CCA checks of the first CCA performed on the one or more secondary subchannels.

20. The wireless communication device of claim 19, wherein, to determine whether the primary subchannel of the first bandwidth segment of the channel is idle, the at least one memory communicatively coupled with the at least one processor and storing the processor-readable code that, when executed by the at least one processor in conjunction with the at least one modem, is configured to perform an energy detection CCA (CCA-ED) check for the primary subchannel of the first bandwidth segment; and
  wherein, to determine whether the one or more secondary subchannels of the first bandwidth segment are idle, the at least one memory communicatively coupled with the at least one processor and storing the processor-readable code that, when executed by the at least one processor in conjunction with the at least one modem, is configured to perform one or more CCA-ED checks for the one or more secondary subchannels.

21. The wireless communication device of claim 20, wherein the CCA-ED check for the primary subchannel of the first bandwidth segment of the channel and the one or more CCA-ED checks for the one or more secondary subchannels of the first bandwidth segment each comprise a negative 62 dBm threshold check.

22. The wireless communication device of claim 19, wherein, to determine whether the primary subchannel of the first bandwidth segment of the channel is idle, the at least one memory communicatively coupled with the at least one processor and storing the processor-readable code that, when executed by the at least one processor in conjunction with the at least one modem, is configured to perform a preamble detection CCA (CCA-PD) check for the primary subchannel of the first bandwidth segment; and
  wherein, to determine whether the one or more secondary subchannels of the first bandwidth segment are idle, the at least one memory communicatively coupled with the at least one processor and storing the processor-readable code that, when executed by the at least one processor in conjunction with the at least one modem, is configured to perform one or more CCA-PD checks for the one or more secondary subchannels.

23. The wireless communication device of claim 21, wherein a preamble detection CCA (CCA-PD) check for the primary subchannel of the first bandwidth segment of the channel comprises a negative 82 dBm threshold.

24. The wireless communication device of claim 21, wherein the channel has a collective bandwidth of 80 MHz, 160 MHz, or 320 MHz.

25. The wireless communication device of claim 21, wherein the at least one memory communicatively coupled with the at least one processor and storing the processor-readable code that, when executed by the at least one processor in conjunction with the at least one modem, is further configured to:
  generate one or more CCA indication reports based on at least one of the primary bandwidth CCA check of the first CCA, the one or more secondary bandwidth CCA checks of the first CCA, the primary bandwidth CCA check of the second CCA, or the one or more secondary bandwidth CCA checks of the second CCA, the one or more CCA indication reports including an indication of a status each 20 MHz subchannel of the channel.

26. The wireless communication device of claim 25, wherein the one or more CCA indication reports include a first CCA report for the primary subchannel of the first bandwidth segment of the channel, at least a second CCA report for the one or more secondary subchannels of the first bandwidth segment, a third CCA report for the secondary primary subchannel of the second bandwidth segment of the channel, and at least a fourth CCA report for the one or more secondary subchannels of the second bandwidth segment.

27. The wireless communication device of claim 18, wherein, to cause the communication to be transmitted on the channel, the at least one memory communicatively coupled with the at least one processor and storing the processor-readable code that, when executed by the at least one processor in conjunction with the at least one modem, is configured to cause data to be transmitted using the channel based on at least one of a determination that the primary subchannel of the first bandwidth segment of the channel is idle, a determination that the one or more secondary subchannels of the first bandwidth segment are idle, a determination that the secondary primary subchannel of the second bandwidth segment of the channel is idle, or a determination that the one or more secondary subchannels of the second bandwidth segment are idle.

28. The wireless communication device of claim 18, wherein, to cause the communication to be transmitted on the channel, the at least one memory communicatively coupled with the at least one processor and storing the processor-readable code that, when executed by the at least one processor in conjunction with the at least one modem, is configured to cause data to be transmitted on at least one puncture set of the primary subchannel of the first bandwidth segment of the channel, the one or more secondary subchannels of the first bandwidth segment, the secondary primary subchannel of the second bandwidth segment of the channel, and the one or more secondary subchannels of the second bandwidth segment in accordance with a preamble puncturing pattern matching corresponding idle values from the primary bandwidth CCA check of the first CCA, the one or more secondary bandwidth CCA checks of the first CCA, the primary bandwidth CCA check of the second CCA, and the one or more secondary bandwidth CCA checks of the second CCA.

29. The wireless communication device of claim 28, wherein, to cause the communication to be transmitted on the channel, the at least one memory communicatively coupled with the at least one processor and storing the processor-readable code that, when executed by the at least one processor in conjunction with the at least one modem, is configured to cause data to be transmitted on the first bandwidth segment of the channel and the second bandwidth segment of the channel based on a resource unit allocation for the first bandwidth segment of the channel and second bandwidth segment of the channel.

30. The wireless communication device of claim 29, wherein the primary bandwidth CCA check of the first CCA has a first CCA threshold of negative 62 dBm and the primary bandwidth CCA check of the second CCA has a second CCA threshold of negative 66 dBm, and wherein each CCA check of the primary bandwidth CCA check of the first CCA and the one or more secondary bandwidth CCA checks of the first CCA are performed serially.

31. The wireless communication device of claim 18, wherein the wireless communication device is an access point (AP) or a mobile station (STA).

32. The wireless communication device of claim 18, wherein:
to perform the one or more secondary bandwidth CCA checks of the first CCA on the one or more secondary subchannels of the first bandwidth segment, the at least one memory communicatively coupled with the at least one processor and storing the processor-readable code that, when executed by the at least one processor in conjunction with the at least one modem, is configured to perform a respective secondary bandwidth CCA check of the first CCA on each of the one or more secondary subchannels of the first bandwidth segment; and
to perform the one or more secondary bandwidth CCA checks of the second CCA on the one or more secondary subchannels of the second bandwidth segment, the at least one memory communicatively coupled with the at least one processor and storing the processor-readable code that, when executed by the at least one processor in conjunction with the at least one modem, is configured to perform a respective secondary bandwidth CCA check of the second CCA on each of the one or more secondary subchannels of the second bandwidth segment.

* * * * *